US011409295B1

(12) United States Patent
Samdaria et al.

(10) Patent No.: US 11,409,295 B1
(45) Date of Patent: Aug. 9, 2022

(54) DYNAMIC POSITIONING OF AN AUTONOMOUS MOBILE DEVICE WITH RESPECT TO A USER TRAJECTORY

(71) Applicant: AMAZON TECHNOLOGIES, INC., Seattle, WA (US)

(72) Inventors: Sandeep Samdaria, Sunnyvale, CA (US); Amin Hani Atrash, Los Altos, CA (US); Saurabh Gupta, Sunnyvale, CA (US); Sven Cremer, Sunnyvale, CA (US); Raumi Sidki, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 131 days.

(21) Appl. No.: 16/119,407

(22) Filed: Aug. 31, 2018

(51) Int. Cl.
  *G05D 1/02* (2020.01)
  *G01C 21/00* (2006.01)
  *B60W 50/00* (2006.01)
  *G01C 21/34* (2006.01)

(52) U.S. Cl.
  CPC ....... *G05D 1/0214* (2013.01); *B60W 50/0097* (2013.01); *G01C 21/005* (2013.01); *G01C 21/3461* (2013.01); *B60W 2554/00* (2020.02)

(58) Field of Classification Search
  CPC .............. G05D 1/0214; G01C 21/3461; G01C 21/005; B60W 50/0097; B60W 2554/00
  See application file for complete search history.

(56) References Cited

U.S. PATENT DOCUMENTS

| | | | |
|---|---|---|---|
| 2006/0106496 A1* | 5/2006 | Okamoto | G05D 1/0278 700/255 |
| 2008/0040040 A1* | 2/2008 | Goto | G05D 1/024 701/301 |
| 2015/0210311 A1* | 7/2015 | Maurer | B60W 30/09 701/41 |
| 2017/0183004 A1* | 6/2017 | Bonarens | G08G 1/165 |
| 2017/0190051 A1* | 7/2017 | O'Sullivan | B25J 9/163 |

* cited by examiner

*Primary Examiner* — Jess Whittington
*Assistant Examiner* — Brian E Yang
(74) *Attorney, Agent, or Firm* — Lindauer Law, PLLC

(57) ABSTRACT

A robot uses types of behavior such as approach, follow, avoid, and so forth to move about an environment and interact with a user. An occupancy map provides information about obstacles in the environment. A predicted trajectory of the user is determined that is indicative of expected locations and confidence of those expected locations. The predicted trajectory may be based on the user's movement and the occupancy map. Based on the predicted trajectory and the occupancy map, a target point and a path to the target point is determined. The path may also be based on a proxemic cost map that specifies how regions with respect to the user may be traversed.

20 Claims, 9 Drawing Sheets

DYNAMIC POSITIONING OF AN AUTONOMOUS MOBILE DEVICE WITH RESPECT TO A USER TRAJECTORY

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
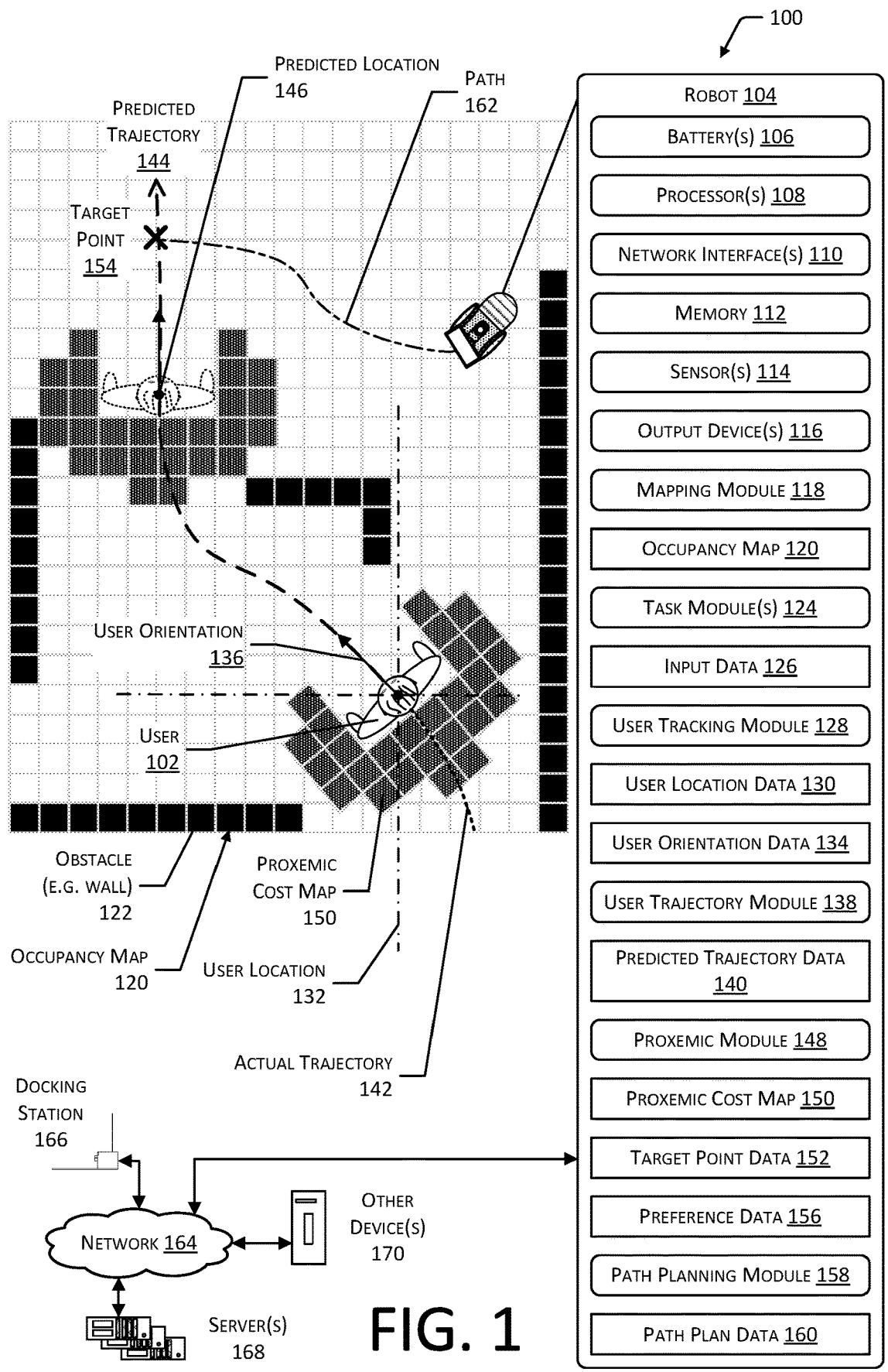
FIG. 1 illustrates a system that includes a robot which is able to dynamically position itself with respect to a user's predicted trajectory, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, a robotic assistant (robot) may perform various tasks. The robot is capable of autonomous movement, allowing it to move from one location in the environment to another without being "driven" or remotely controlled by the user or other human. Some of the tasks the robot performs may involve the robot moving about an environment.

Because users may be in motion within the environment, the robot should be able to move and position itself with respect to these moving users in a way that is consistent with the requirements of the task. For example, a task that involves a robot presenting audio to a user requires the robot to be at a suitable listening distance from the user so that the user is able to hear without the robot using such a high volume that others in the environment may be disturbed. If the user is in motion, the robot may attempt to approach the user by moving to a point where the user has been. As a result, the robot will be constantly lagging behind the user.

The situation can be complicated when obstacles in the environment prevent the robot from maintaining a line of sight with the user. If the user is outside of the line of sight, the sensors on the robot are unable to determine the location of the user at a particular time. For example, if the user moves such that a piece of furniture or wall is between the user and the robot, the robot does not know where the user now is and may try to go to the last known location of the user. As a result, the robot would now be farther behind the user that it is trying to approach. As a result, the robot may be unable to perform the task.

Described in this disclosure is a system that implements techniques for determining a predicted trajectory for a user and using this predicted trajectory to determine a target point. A path with the target point as the destination is determined. At the target point, the robot is likely to intercept the user, or the robot is likely to avoid the user, depending on the task that the robot is performing.

The predicted trajectory may be based on information gathered by sensors on the robot, in the environment, and so forth. The predicted trajectory may be based at least in part on an occupancy map, actual user trajectories, and so forth. The occupancy map provides information that is indicative of placement of obstacles in the physical environment. These obstacles may include an object or an aspect of an area that impedes movement of the robot. The occupancy map may indicate the presence of walls, furniture, shag carpet that would snarl the robot's wheels, and so forth by providing obstacle cost values for particular areas. For example, a high obstacle cost value may indicate a wall or piece of furniture that the robot is not able to pass through, while a low obstacle cost value may indicate a smooth flat floor. The occupancy map is used to determine a predicted trajectory that does not involve the user passing through a wall, exiting through a window, and so forth.

The actual user trajectories may be based on data from sensors in the environment. For example, cameras on the robot may acquire images of the user moving about the environment, and determine the location of the user at different times. Based on these locations an actual trajectory may be determined.

The actual user trajectories may be based on historical data for a particular user that is identified or for other users. For example, the robot may use facial recognition, speech recognition, or other techniques to determine a user identifier that is associated with the user. If the robot determines actual trajectories for that particular user identifier that involve the user travelling into the laundry room, at a later time the predicted trajectory for the user identifier may be used to determine that the user is likely to enter the laundry room. In another example, the robot may determine actual trajectories for one or more users, identified or not, to determine that users are moving from a left side of a pillar to a right side of a pillar. Based on these actual trajectories, the robot may determine a predicted trajectory for a user that moves from the left side to the right side.

The actual trajectory may then be used in conjunction with the occupancy map to determine a predicted trajectory that provides an estimation of where the user may be at some point in the future. For example, if the actual trajectory indicates that the user is at a first location and heading East at 1 meter/second (m/s) as of time t=1, assuming no change in the user's movement, the predicted trajectory may indicate a predicted location at t=2 that is 1 meter East of the first location. Additionally, the predicted location is in an area that is indicated by the occupancy map as being unimpeded by obstacles. A predicted orientation of the user may also be determined. For example, the predicted orientation of the user may be along a line extending from the predicted location to a later point along the predicted trajectory.

In other implementations the predicted trajectory may be based on other information. For example, if the user had set a cooking timer which has now expired, the predicted trajectory may involve entry to the kitchen. In another example, if the user's calendar indicates that they are leaving for an appointment within a few minutes, a predicted trajectory that enters the garage may be determined.

The tasks performed by the robot may involve various behaviors with respect to the users in the environment. These behaviors may include approach behavior, follow behavior, and avoid behavior. For example, a task such as "present an incoming video call" may involve the robot using the approach behavior to move to a position in front of the user. In another example, the user may request that the robot follows the user, involving a follow behavior. In yet another example, the robot may perform a sentry task and use an avoid behavior to stay away from users. These behaviors may be specific to particular users. For example, if the robot is trying to find a particular user, it may avoid other users and then approach the particular user.

By using the predicted trajectory of the user, the robot is able to intelligently determine how to complete those tasks. For example, if the task involves the robot approaching the user, instead of the robot trying to catch the user from behind, the robot may use the predicted trajectory to find a path that places the robot ahead of the user. In another example, if the task involves the robot avoiding the user, the predicted trajectory helps the robot determine what areas in the environment to avoid at a given time to minimize interfering with the user's movement.

The robot may also move in a way that is consistent with the expectations of the users to avoid interfering with users or producing an undesirable result. For example, if the robot approaches a user from directly behind where the user is unable to see, the robot may startle the user.

The path from a current location of the robot to the target point may be determined using the occupancy map. For example, the path of the robot should avoid walls or other obstacles that would impede the robot's movement. The path may also be determined using a proxemic cost map in conjunction with the occupancy map.

Tasks that involve behaviors such as approach and follow may result in the system determining a target point and distance that is based on the predicted location and predicted orientation of the user. The target point may be determined based on the predicted location and predicted orientation of the user as indicated by the predicted trajectory. For example, an approach behavior may have a target point that is directly in front of the predicted location of the user within a preferred angle with respect to the predicted orientation. The interaction distance between the user and the target point may be determined based on the task. For example, if the task involves the user providing input to a touch screen on the robot, the interaction distance may be 0.4 meters, placing the robot within reach.

The proxemic cost map to be used in determining a path may be determined based at least in part on the task. Continuing the example, if the task involves an approach, a particular proxemic cost map that permits the robot to approach is used. The proxemic cost map may be represented as a plurality of cells, such as a grid array, that each describe an area that is positioned with respect to the location of the user and oriented with respect to the orientation of the user. The proxemic cost map provides a proxemic cost value for the traversal by the robot through a particular area or region.

During path planning, the robot may select a path that involves a lowest cost of the obstacle cost values indicated by the occupancy map and the proxemic cost values. For example, the proxemic cost map may assign a relatively high proxemic cost value to an area that is behind the user and in their visual blind spot, while the area directly in front of the user may have a relatively low proxemic cost value. The path that exhibits the lowest cost, that is the path which passes through the area in front of the user which is free from obstacles, may then be selected for use.

The proxemic cost maps may be generalized and used for many users. In other implementations, the proxemic cost maps may be customized to a particular user and associated with their user identifier. For example, a user with impaired vision on their right side may have a proxemic cost map that places high cost values on the right side and low cost values on the left side.

During operation of the system, the robot determines the types of behavior associated with the task. For example, the task may involve one or more of an approach, follow, or avoid behavior.

Use of the predicted trajectory of the user improves the ability of the robot to safely and effectively operate around and with users. The robot is able to anticipate the movements of the user and more easily avoid collisions with the user, while still being close by to perform a required task. Additionally, the use of the predicted trajectory may reduce power consumption and improve operational runtime of the robot by reducing the incidence of the robot trying to catch up to a user who is in motion.

Illustrative System

FIG. 1 illustrates a system 100 in which a user 102 uses a robot 104 that is able to dynamically position itself with respect to a predicted trajectory 144 of the user 102, according to some implementations. The robot 104 may include a battery(s) 106 to provide electrical power for operation of the robot 104. The battery 106 may be rechargeable, allowing it to store electrical energy obtained from an external source. In other implementations a wireless power receiver may be used to provide power for operation of the robot 104, recharge the battery 106, and so forth. The robot 104 may include a hardware processor(s) 108 (processor), a network interface(s) 110, a memory(s) 112, sensors 114, and output devices 116. These devices are discussed in more detail with regard to FIGS. 2 and 3.

A mapping module 118 may be stored in the memory 112. The mapping module 118 may use data from the sensors 114 to determine an occupancy map 120 or other representation of the physical environment. For example, one or more cameras may obtain image data of the physical environment. The image data may be processed to determine the presence of obstacles 122. The occupancy map 120 may comprise data that indicates the location of one or more obstacles 122, such as a table, wall, and so forth. In some implementations, the occupancy map 120 may comprise a plurality of cells with each cell of the plurality of cells representing a particular area in the physical environment and having an obstacle cost value that is indicative of whether the cell contains an obstacle 122. An obstacle 122 may comprise an object or feature that prevents or impairs traversal of the robot 104. For example, an obstacle 122 may comprise a wall, stairwell, and so forth. In this illustration, the darker the shading in the cell, the greater the obstacle cost value associated with that cell. For example, cells associated with the wall are black as they present a high obstacle cost value. Continuing the example, cells associated with the smooth flat floor are white (no shading).

One or more task modules 124 may be stored in the memory 112. The task modules 124 may comprise instructions that, when executed by the processor 108 perform a task. For example, a video call module may be used to have the robot 104 find a particular user 102 and present a video call using the output devices 116. In another example, a sentry task module 124 may be used to have the robot 104 travel throughout the home, avoid users 102, and generate a report as to the presence of an unauthorized person.

During operation the robot 104 may determine input data 126. The input data 126 may include sensor data from the sensors 114 onboard the robot 104. For example, the input data 126 may comprise a verbal command provided by the user 102 and detected by a microphone on the robot 104.

In some situations, the task performed by the robot 104 may include moving the robot 104 within the physical environment. These tasks may involve various behaviors by the robot 104. These behaviors may include an approach behavior, a follow behavior, an avoid behavior, and so forth. For example, the robot 104 may be directed to perform a task that includes presenting a video call on a display output device 116 to a first user 102. This task may include an avoidance behavior causing the robot 104 to avoid other users 102 while seeking out the first user 102. When found, the robot 104 uses an approach behavior to move near the first user 102.

The robot 104 may include in the memory 112 a user tracking module 128. The user tracking module 128 may use data from the sensors 114 on the robot 104 or other sensors in the physical environment. The user tracking module 128 processes the data to determine user location data 130 indicative of a user location 132 in the physical environment. The user location data 130 may be indicative of coordinates within the physical environment that are indicative of a point associated with the user 102. For example, the user location data 130 may indicate a centroid of the area occupied by the user 102 with respect to a fixed coordinate system used to represent locations within the physical environment.

The user tracking module 128 may also process the data to determine user orientation data 134 indicative of a user orientation 136 in the physical environment. The user orientation data 134 is indicative of a direction with respect to a fixed reference. For example, the user orientation data 134 may be indicative of a heading as measured with respect to magnetic north, or an angle with respect to an axis of the fixed coordinate system. In some implementations, the user orientation data 134 may be indicative of an angle that extends from a reference point with respect to the user 102 along a direction that is specified with respect to one or more features of the user 102. For example, the user orientation data 134 may be based on a position of one or more of the user's 102 head, shoulders, skeleton, feet, eyes, and so forth. In another example, the user orientation data 134 may be based at least in part on a gaze direction of the user 102, that is indicative of which direction the user 102 is looking. In one implementation, the user orientation data 134 may indicate the line that is perpendicular from a line extending through the shoulders of the user 102, and extending away from the user 102 in a ventral direction. For example, if the user 102 is standing and facing East, the user orientation data 134 may indicate 90 degrees. In another implementation, the user orientation data 134 may indicate a line that is perpendicular to a line extending through both eyes of the user 102 and starts at a midpoint between the eyes.

A user trajectory module 138 determines predicted trajectory data 140. The user trajectory module 138 may utilize one or more of the user location data 130 obtained at a plurality of times, user orientation data 134, or data from other sources, to determine the predicted trajectory data 140. The predicted trajectory data 140 is indicative of a route through the physical environment, or a series of waypoints in the physical environment, along which the user 102 is considered likely to pass. The user trajectory module 138 may use the user location data 130 to generate data indicative of an actual trajectory 142 of the user 102. For example, the actual trajectory 142 may comprise a time series of the user location data 130 for the user 102.

The predicted trajectory data 140 is indicative of a predicted trajectory 144 along which the user 102 is deemed likely to move. A predicted location 146 may comprise a point along the predicted trajectory 144. A predicted orientation of the user 102 (not shown) may also be determined for a predicted location 146.

The user trajectory module 138 may determine the predicted trajectory 144 based on information gathered by sensors on the robot 104, in the environment, and so forth. The predicted trajectory 144 may be based at least in part on the occupancy map 120, actual trajectories 142 of the user 102, and so forth. The occupancy map 120 is used to determine a predicted trajectory 144 that does not involve the user 102 passing through a wall, exiting through a window, and so forth.

In some implementations, the user trajectory module 138 may use actual trajectories 142 from historical data. This historical data may indicate actual trajectories 142 of a particular user 102 that is identified, or for other users 102 who are not otherwise identified. For example, the system 100 may use facial recognition, speech recognition, or other techniques to determine a user identifier that is associated with the user 102. The user trajectory module 138 may determine that the actual trajectories 142 for that particular user identifier involves the user 102 travelling into the laundry room. Based on this historical data, the predicted trajectory 144 for the user identifier may enter the laundry room. In another example, the user trajectory module 138 may determine actual trajectories 142 for one or more users 102 who are not otherwise identified, or for whom the user identifiers may be disregarded.

The user trajectory module 138 may use other data to determine the predicted trajectory 144. For example, information about an expired cooking timer for activity in the kitchen may be used to determine a predicted trajectory 144 that enters the kitchen. In another example, if calendar data associated with the user 102 indicates that the user 102 has an appointment at another location within a few minutes, a predicted trajectory 144 that enters the garage may be determined.

In some implementations the predicted trajectory data 140 may comprise a time series of waypoints along the predicted trajectory 144, each waypoint indicative of a particular location within the physical environment, and a confidence value that is indicative of a likelihood that the waypoint is correct. The confidence values for subsequent waypoints along the predicted trajectory 144 may have decreasing confidence values due to increased uncertainty as to the predicted location 146.

A proxemic module 148 may be used to select, generate, modify, or otherwise manipulate a proxemic cost map 150. The proxemic cost map 150 may be represented as a plurality of cells, such as a grid array, that is positioned with respect to the user location data 130 and oriented with respect to the user orientation data 134. The proxemic cost map 150 provides a proxemic cost value for the traversal by the robot through a particular area or region. While the proxemic cost map 150 is depicted as a grid, the proxemic cost map 150 may be represented in terms of a mathematical function. For example, the proxemic cost map 150 may comprise a function that, when provided with input including a relative distance and bearing with respect to the user location data 130 and the user orientation 136, produces as output a cost value. The proxemic cost map 150 may have a particular orientation as exhibited by areas with different proxemic cost values. For example, the proxemic cost values associated with cells in front of the user 102 may be lower than the proxemic cost values associated with cells behind the user 102.

The proxemic module 148 may access previously stored proxemic cost maps 150. For example, different proxemic cost maps 150 may be generated for different behaviors, such as approach, follow, avoid, and so forth. The proxemic cost map 150 may be considered to represent areas where movement of the robot 104 near and with respect to the user 102 may be encouraged or discouraged.

In some implementations, the proxemic module 148 may select proxemic cost maps 150 based on localization settings. For example, users 102 in different countries may have different expectations as to how the robot 104 should move with respect to them, and so use different proxemic cost maps 150. Accordingly, the proxemic module 148 may select proxemic cost maps 150 that are consistent with those expectations.

The proxemic module 148 may modify the proxemic cost map 150 based on input. For example, if the user 102 provides input indicative of approval or disapproval of a particular behavior, the proxemic cost map 150 may change the cost values in the proxemic cost map 150 for subsequent use. Continuing the example, if the user 102 says "don't approach on my right" the proxemic module 148 may increase the cost values of the cells on the right side of the proxemic cost map 150.

In one implementation, the proxemic cost map 150 may be visualized as moving with the user 102. For example, as the user 102 walks through the room, the proxemic cost map 150 associated with that user 102 moves with them. For example, the proxemic cost map 150 may be centered on the user location 132 and aligned with the user orientation 136.

When a task involves the robot 104 approaching or following a user 102, one or more of the user trajectory module 138 or the proxemic module 148 may determine target point data 152 indicative of a target point 154. The location of the target point 154 may be based on the predicted trajectory data 140 and in some implementations at least in part on the proxemic cost map 150.

In one implementation, the user trajectory module 138 may determine the target point 154 based on the predicted trajectory 144. For example, a point on the predicted trajectory 144 that is closest to the robot 104 based on travel distance to that point may be designated as the target point 154. In another implementation, the user trajectory module 138 may use the predicted trajectory data 140 and data from the proxemic module 148, such as the proxemic cost map 150, to determine the target point 154. For example, the target point 154 may comprise a point that is proximate to the predicted trajectory 144 that exhibits a lowest sum of obstacle score values from the occupancy map 120 and proxemic cost values from the proxemic cost map 150.

The target point 154 is located at an interaction distance from the predicted location 146 of the user 102. The interaction distance may be based at least in part on the task. For example, a task that involves the user 102 possibly manipulating a control on the robot 104 would have an interaction distance that is close enough to allow that contact. The target point 154 may be located within a preferred angle with respect to the predicted orientation 404 of the user 102 if they were at the predicted location 146. The target point 154 and interaction distance is discussed in more detail with regard to FIG. 4.

The proxemic module 148 may use preference data 156 during operation. The preference data 156 may specify a preferred angle for placement of the target point 154. The preference data 156 may specify the interaction distance. In some implementations the preference data 156 may be associated with a particular group of users 102, individual user 102, and so forth. For example, the user 102(1) may specify that they prefer an interaction distance that is greater than a default interaction distance for a particular task or all tasks. In some implementations the preference data 156 may associate a particular proxemic cost map 150 with a particular user 102.

The robot 104 includes a path planning module 158. The path planning module 158 generates path plan data 160 that is indicative of a path 162 through the physical environment. During operation, the path planning module 158 may use as input the occupancy map 120 and the proxemic cost map 150. The path planning module 158 may accept as input the target point 154 as a destination point and then determines the path plan data 160 that describes a path 162 to the target point 154. The path planning module 158 may determine a path 162 that exhibits a lowest total cost based on the combined cost values, or sum of, the obstacle cost values in the occupancy map 120 and the cost values in the proxemic cost map 150 for cells that are traversed by the path 162.

In other implementations the path planning module 158 may use other techniques to determine the path 162. For example, the path planning module 158 may be configured to determine a path 162 that does not exceed a maximum combined cost in at least one cell. In another example, the path planning module 158 may determine the path 162 based on a length of a path, transit time, combined costs, and so forth.

If the task involves the robot 104 approaching or following the user 102, the path planning module 158 may use the target point data 152 that is based on the predicted location 146 as the destination to determine the path plan data 160. The resulting path 162 represented by the path plan data 160 may lead from the current location of the robot 104 to the target point 154 and takes into consideration the presence of obstacles 122 as indicated in the proxemic cost map 150.

In some implementations the robot 104 may be unable to comply with the task. For example, the user 102 may be moving too quickly for the robot 104 to catch up. In another example the user 102 may close a door, blocking the robot's 104 path. The system 100 may be configured to cease trying to reach the target point 154, generate a notification, and so forth. For example, if the robot 104 sees the user 102 is moving too quickly to catch, the robot 104 may present an audible and visual notification to try and attract the attention of the user 102.

The use of the proxemic cost map 150 allows the robot 104 to move about the physical environment in a way that is more consistent with a user's expectations and improves safety of the use of the robot 104 around the user 102. Because the path planning module 158 is using the combined cost values to determine the path plan data 160, the path 162 in some situations may involve the traversal of an area that is designated as a high cost area by the proxemic cost map 150. For example, if the user 102 is sitting at a desk, the robot 104 is unable to approach from the user's 102 front as the desk is an obstacle 122 that the robot 104 is not able to traverse. Instead, the robot 104 may approach from one side or another, such as near the user's 102 right elbow.

In some implementations, the path planning module 158 may be part of, or used in conjunction with, an autonomous navigation module. For example, the autonomous navigation module may determine a current location of the robot 104 and determine an overall course that the robot 104 is to follow to perform the task, while the path planning module 158 handles a portion of that course that is proximate to the robot 104. Continuing the example, the path planning module 158 may be used to determine a course from the robot's 104 current location to a first waypoint elsewhere in the room that was determined by the autonomous navigation module. The autonomous navigation module is discussed in more detail with regard to FIG. 2.

The path 162 is representative of where the robot 104 is expected to go and may differ from an actual path followed by the robot 104. For example, appearance of an obstacle 122 along the path 162 may result in the robot 104 determining new path plan data 160 indicative of a different path 162 around the obstacle 122.

The path planning module 158 may determine path plan data 160 at specified intervals, upon receipt of data indicative of a change, and so forth. For example, the path planning module 158 may determine path plan data 160 at a specified interval, such as every 200 ms, or every meter. Appearance of an obstacle 122 may result in determination of path plan data 160 outside of the specified interval. The user trajectory module 138 may also determine predicted trajectory data 140 at specified intervals, upon a change in location of the user 102, and so forth.

In some implementations, the path planning module 158 may generate a plurality of possible paths to the target point 154, and then score or rank those paths. A highest scoring path, deemed to be most suitable, may then be selected and used as the path plan data 160. For example, the ranking may be based on the sum of the combined values of the obstacle cost values, proxemic cost values, and so forth for the areas or cells that are traversed by the possible path. In other implementations the ranking may be based on time to arrive.

The path plan data 160 may be subsequently used to direct the movement of the robot 104. For example, the path plan data 160 may comprise a series of control instructions that are configured to be processed by a motor controller. These control instructions may comprise data indicative of a rotation rate of one or more motors, a duration of rotation, a total number of rotations of the one or more motors, and so forth. For example, the control instructions may instruct the motor controller to operate a first motor on a left side of the robot 104 at a rate of 10.0 radians per second (rad/s) for 5 seconds and a second motor on a right side of the robot 104 at a rate of 9.7 rad/s for 5 seconds.

The path plan data 160 may comprise other data. In one implementation, the path plan data 160 may be a vector indicative of a direction and distance, expressed relative to the chassis of the robot 104. For example, the path plan data 160 may comprise a vector value indicative of a direction and a distance, such as +12 degrees and 1.72 meters. In another implementation the path plan data 160 may comprise one or more waypoints that describe a location through or past which the robot 104 is to move. In yet another implementation the path plan data 160 may comprise a trajectory. For example, a set of coefficients may be used as inputs to an equation that describes a path along a plane or in space.

The motor controller may use the path plan data 160 to operate the motors of the robot 104 such that the robot 104 moves along the planned path 162. Continuing the example above, the motor controller may execute the instructions, resulting in the motors moving the robot 104.

The robot 104 may use the network interfaces 110 to connect to a network 164. For example, the network 164 may comprise a wireless local area network, that in turn is connected to a wide area network such as the Internet.

The robot 104 may be configured to dock or connect to a docking station 166. The docking station 166 may also be connected to the network 164. For example, the docking station 166 may be configured to connect to the wireless local area network such that the docking station 166 and the robot 104 may communicate. The docking station 166 may provide external power which the robot 104 may use to charge the battery 106.

The robot 104 may access one or more servers 168 via the network 164. For example, the robot 104 may utilize a wake word detection module to determine if the user 102 is addressing a request to the robot 104. The wake word detection module may hear a specified word or phrase and transition the robot 104 or portion thereof to the wake operating mode. Once in the wake mode, the robot 104 may then transfer at least a portion of the audio spoken by the user 102 to one or more servers 168 for further processing. The servers 168 may process the spoken audio and return to the robot 104 data that may be subsequently used to operate the robot 104.

The robot 104 may also communicate with other devices 170. The other devices 170 may include home automation controls, sensors, and so forth that are within the home or associated with operation of one or more devices in the home. For example, the other devices 170 may include a doorbell camera, a garage door, a refrigerator, washing machine, a network connected microphone, and so forth. In some implementations the other devices 170 may include other robots 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 2:
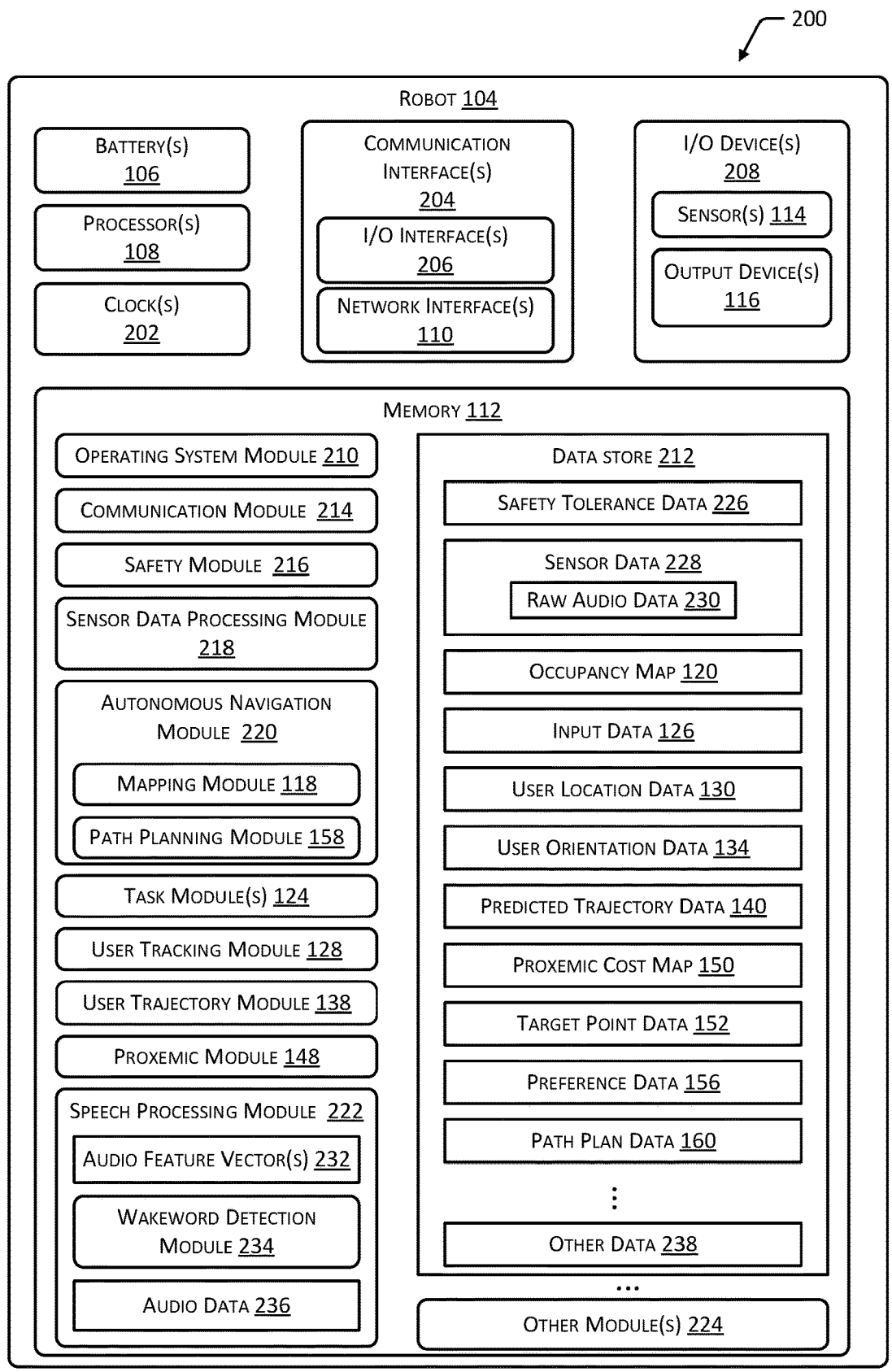
FIG. 2 is a block diagram of the components of the robot, according to some implementations.

FIG. 2 is a block diagram 200 of the robot 104, according to some implementations. The robot 104 may include one or more batteries 106 to provide electrical power suitable for operating the components in the robot 104. In some implementations other devices may be used to provide electrical power to the robot 104. For example, power may be provided by wireless power transfer, capacitors, fuel cells, storage flywheels, and so forth.

The robot 104 may include one or more hardware processors 108 (processor) configured to execute one or more stored instructions. The processors 108 may comprise one or more cores. The processors 108 may include microcontrollers, systems on a chip, field programmable gate arrays, digital signals processors, graphic processing units, general processing units, and so forth. One or more clocks 202 may provide information indicative of date, time, ticks, and so forth. For example, the processor 108 may use data from the clock 202 to associate a particular interaction with a particular point in time.

The robot 104 may include one or more communication interfaces 204 such as input/output (I/O) interfaces 206, network interfaces 110, and so forth. The communication interfaces 204 enable the robot 104, or components thereof, to communicate with other devices 170 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 114, keyboard, mouse, scanner, and so forth. The I/O devices 208 may also include output devices 116 such as one or more of a motor, light, speaker, display, projector, printer, and so forth. In some embodiments, the I/O devices 208 may be physically incorporated with the robot 104 or may be externally placed.

The network interfaces 110 may be configured to provide communications between the robot 104 and other devices 170 such as other robots 104, a docking station 166, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, Wi-Fi, Bluetooth, Bluetooth Low Energy, ZigBee, and so forth.

The robot 104 may also include one or more busses or other internal communications hardware or software that allow for the transfer of data between the various modules and components of the robot 104.

As shown in FIG. 2, the robot 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the robot 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 170 including other robots 104, servers, network attached storage devices, and so forth.

A communication module 214 may be configured to establish communication with other devices 170, such as other robots 104, an external server 168, a docking station 166, and so forth. The communications may be authenticated, encrypted, and so forth.

Other modules within the memory 112 may include a safety module 216, a sensor data processing module 218, an autonomous navigation module 220, the one or more task modules 124, the path planning module 158, the user tracking module 128, the user trajectory module 138, the proxemic module 148, a speech processing module 222, or other modules 224. The modules may access data stored within the data store 212, such as safety tolerance data 226, sensor data 228, or other data 238.

The safety module 216 may access safety tolerance data 226 to determine within what tolerances the robot 104 may operate safely within the physical environment. For example, the safety module 216 may be configured to stop the robot 104 from moving when the extensible mast is extended. In another example, the safety tolerance data 226 may specify a minimum sound threshold which, when exceeded, stops all movement of the robot 104. Continuing this example, detection of sound such as a human yell would stop the robot 104. In another example, the safety module 216 may access safety tolerance data 226 that specifies a minimum distance from an object that the robot 104 may maintain. Continuing this example, when a sensor 114 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more the motors, and so forth. The safety module 216 may be implemented as hardware, software, or a combination thereof.

The safety module 216 may control other factors, such as a maximum speed of the robot 104 based on information obtained by the sensors 114, precision and accuracy of the sensor data 228, and so forth. For example, detection of an object by an optical sensor may include some error, such as when the distance to an object comprises a weighted average between an object and a background. As a result, the maximum speed permitted by the safety module 216 may be based on one or more factors such as the weight of the robot 104, nature of the floor, distance to object, and so forth. In the event that the maximum permissible speed differs from the maximum speed permitted by the safety module 216, the lesser speed may be utilized.

The sensor data processing module 218 may access sensor data 228 that is acquired from one or more the sensors 114. The sensor data processing module 218 may provide various processing functions such as de-noising, filtering, change detection, and so forth. Processing of sensor data 228, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 228. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 228 or other data 238. For example, the ANN may be a trained using a supervised learning algorithm such that object identifiers are associated with images of particular objects within training images provided to the ANN. Once trained, the ANN may be provided with the sensor data 228 and produce output indicative of the object identifier.

The autonomous navigation module 220 provides the robot 104 with the ability to navigate within the physical environment without real-time human interaction. The autonomous navigation module 220 may implement, or operate in conjunction with, the mapping module 118 to determine the occupancy map 120 or other representation of the physical environment. In one implementation, the mapping module 118 may use one or more simultaneous localization and mapping ("SLAM") techniques. The SLAM algorithms may utilize one or more of maps, algorithms, beacons, or other techniques to provide navigational data. The navigational data may then be used to determine the path plan data 160 which is then subsequently used to determine a set of commands that drive the motors connected to the wheels. For example, the autonomous navigation module 220 may determine a location with the environment, estimate a path to a destination, and so forth.

In some implementations, the path planning module 158 may be part of, or operate in conjunction with, the autonomous navigation module 220. During operation, the autonomous navigation module 220 may use the proxemic cost map 150, target point data 152, preference data 156, and so forth to determine the path plan data 160. As described above, the proxemic module 148 may determine the target point data 152, the proxemic cost map 150, and so forth. The path planning module 158 may be configured to determine a lowest cost path from a plurality of possible paths, based on the combined values of the occupancy map 120, the proxemic cost map 150, and so forth.

The target point data 152 may be based on preference data 156 such as preferred angle, interaction distance, and so forth. The preferred angle data comprises data indicative of a preferred angle, such as with respect to the user orientation 136 or the predicted orientation, within which the target point 154 may be placed. For example, the preferred angle data may specify that the target point 154 may be located in an angle extending from 45 degrees to the left of the user's orientation 136 and 45 degrees to the right of the user's predicted orientation.

The autonomous navigation module 220 may include an obstacle avoidance module. For example, if an obstacle is detected along a planned path, the obstacle avoidance module may re-route the robot 104 to move around the obstacle or take an alternate path.

The autonomous navigation module 220 may utilize various techniques during processing of sensor data 228. For example, image data obtained from cameras on the robot 104 may be processed to determine one or more of corners, edges, planes, and so forth. In some implementations corners may be detected and the coordinates of those corners may be used to produce point cloud data.

The occupancy map 120 may be manually or automatically determined. Continuing the example, during a learning phase the user 102 may take the robot 104 on a tour of the environment, allowing the robot 104 to generate the occupancy map 120 and associated data, such as tags indicating designating a particular room, such as "kitchen" or "bedroom". In another example, during subsequent operation the robot 104 may generate the occupancy map 120 that is indicative of locations of obstacles 122 such as chairs, doors, stairwells, and so forth as it moves unattended through the environment.

In some implementations, the occupancy map 120 may include floor characterization data. The floor characterization data is indicative of one or more attributes of the floor at a particular location within the physical environment. During operation of the robot 104, floor characterization data may be obtained. The floor characterization data may be utilized by one or more of the safety module 216, the autonomous navigation module 220, the task module 124, or other modules 224. For example, the floor characterization data may be used to determine if an unsafe condition occurs such as a wet floor. In another example, the floor characterization data may be used by the autonomous navigation module 220 assist in the determination of the current location of the robot 104 within the home. For example, if the autonomous navigation module 220 determines that the robot 104 is located in the dining room, but the floor characterization data indicates that the floors consistent with the living room, an error condition may be generated in which other techniques are used to determine the location of the robot 104 or otherwise resolve the difference. For example, the robot 104 may attempt to return to the docking station 166 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 102. For example, the robot 104 may use speech synthesis to ask the user 102 "what room is this?" during a training phase. The utterance of the user may be received by the microphone array and the audio data "this is the living room" may processed and subsequently used to generate the location designator.

The autonomous navigation module 220 may be used to move the robot 104 from a first location to a second location within the physical environment. This movement may be responsive to determination made by an onboard processor 108, in response to a command received via one or more communication interfaces 204 or a sensor 114, and so forth. For example, an external server 168 may send a command that is subsequently received using a network interface 110. This command may direct the robot 104 to proceed to a designated destination, such as "living room" or "dining room". The robot 104 may then process this command, and use the autonomous navigation module 220 to determine the directions and distances associated with reaching the specified destination.

The memory 112 may store one or more task modules 124. The task module 124 comprises instructions that, when executed, provide one or more functions associated with a particular task. A task may have one or more behaviors associated with it. The behaviors may then result in the use of particular proxemic cost maps 150, preferred angles, interaction distances, and so forth. For example, a task that involves the user 102 entering data on a touchscreen of the robot 104 may have an interaction distance of 0.5 meters.

Interactions may involve a single behavior. In one example, the task may comprise a security or sentry task in which the robot 104 travels throughout the physical environment avoiding users 102 and looking for events that exceed predetermined thresholds. In another example, the task may comprise a "follow me" feature in which the robot 104 follows a user 102 using a follow behavior. For example, the user 102 may participate in a video call using the robot 104. The camera on the mast may be used to acquire video for transmission while the display is used to present video that is received. The robot 104 may use data from one or more sensors 114 to determine a location of the user 102 relative to the robot 104, and track and follow the user 102. In one implementation, computer vision techniques may be used to locate the user 102 within image data acquired by the cameras. In another implementation, the user's voice may be detected by an array of microphones, and a direction to the voice with respect to the robot 104 may be established. Other techniques may be utilized either alone or in combination to allow the robot 104 to track a user 102, follow a user 102, or track and follow a user 102. The path of the robot 104 as it follows the user 102 may be based at least in part on one or more of constraint cost values. For example, while the robot 104 is following the user 102 down the hallway, the robot 104 may stay to the right side of the hallway. In some situations, while following a user 102 the robot 104 may disregard some rules or may disregard the speed values for a particular area. For example, while following the user 102 the robot 104 may not slow down while passing a doorway.

In yet another example, the task may allow for the robot 104 to be summoned to a particular location. The user 102 may utter a voice command that is heard by a microphone on the robot 104, a microphone in a smart phone, or another device with a microphone such as a network enabled speaker or television. While performing this task, the robot 104 may utilize an avoid behavior until it reaches the particular location.

Alternatively, the user 102 may issue a command using an app on a smartphone, wearable device, tablet, or other computing device. Given that the location of the device at which the command was obtained is known, the robot 104 may be dispatched to that location. If the location is unknown, the robot 104 may search for the particular user 102, utilizing an avoid behavior with respect to other users 102 and an approach behavior for the particular user 102.

The speech processing module 222 may be used to process utterances of the user 102. Microphones may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 164 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector) representing features/qualities of the raw audio data 230 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 234 to perform wakeword detection to determine when a user intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data corresponding to a keyword.

Thus, the wakeword detection module 234 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 168 for speech processing. The audio data 236 corresponding to audio obtained by the microphone may be sent to a server 168 for routing to a recipient device or may be sent to the server 168 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

The robot 104 may connect to the network 164 using one or more of the network interfaces 110. One or more servers 168 may provide various functions, such as ASR, natural language understanding (NLU), providing content such as audio or video to the robot 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input, a task module 124, and so forth. In one implementation, the text string may be sent via a network 164 to a server 168 for further processing. The robot 104 may receive a response from the server 168 and present output, perform an action, and so forth. For example, the raw audio data 230 may include the user saying "robot go to the dining room". The audio data 236 representative of this utterance may be sent to the server 168 that return commands directing the robot 104 to the dining room of the home associated with the robot 104.

The utterance may result in a response from the server 168 that directs operation of other devices 170 or services. For example, the user 102 may say "robot wake me at seven tomorrow morning". The audio data 236 may be sent to the server 168 that determines the intent and generates commands to instruct a device attached to the network 164 to play an alarm at 7:00 am the next day.

The other modules 224 may comprise a speech synthesis module that is able to convert text data to human speech. For example, the speech synthesis module may be used by the robot 104 to provide speech that a user 102 is able to understand.

The data store 212 may store other data 238 such as localization settings, user identifier data, and so forth.

Figure 3:
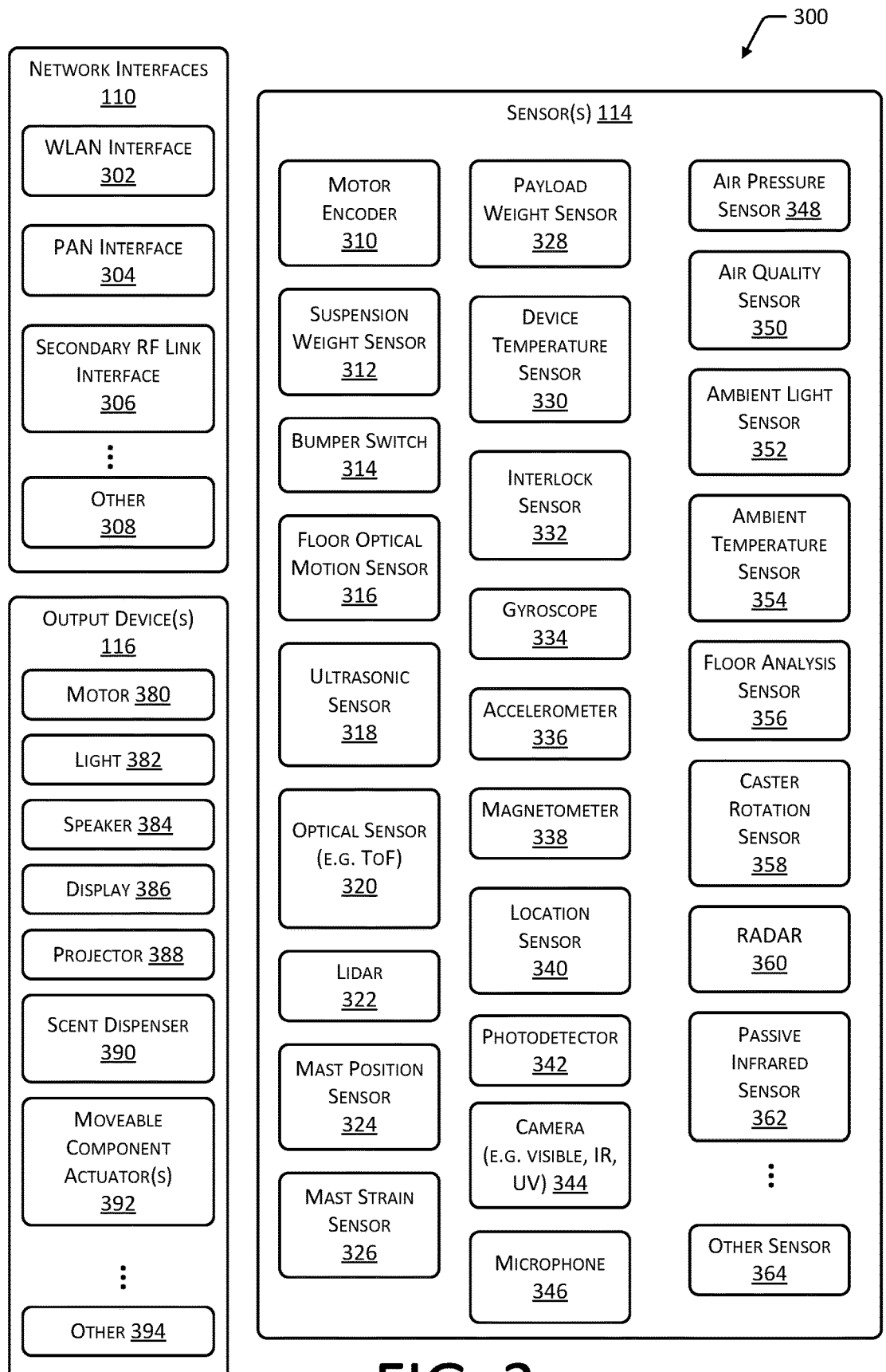
FIG. 3 is a block diagram of some components of the robot such as network interfaces, sensors, and output devices, according to some implementations.

FIG. 3 is a block diagram 300 of some components of the robot 104 such as network interfaces 110, sensors 114, and output devices 116, according to some implementations. The components illustrated here are provided by way of illustration and not necessarily as a limitation. For example, the robot 104 may utilize a subset of the particular network interfaces 110, output devices 116, or sensors 114 depicted here, or may utilize components not pictured. One of more of the sensors 114, output devices 116, or a combination thereof may be included on a moveable component that may be panned, tilted, rotated, or any combination thereof with respect to a chassis of the robot 104.

The network interfaces 110 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices 170 in the event that communication fails using one or more of the WLAN interface 302 or the PAN interface 304. For example, in the event the robot 104 travels to an area within the physical environment that does not have Wi-Fi coverage, the robot 104 may use the secondary RF link interface 306 to communicate with another device such as a specialized access point, docking station 166, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates via by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 114. The sensors 114 depicted here are provided by way of illustration and not necessarily as a limitation. It is understood other sensors 114 may be included or utilized by the robot 104, while some sensors 114 may be omitted in some configurations.

A motor encoder 310 provides information indicative of the rotation or linear extension of a motor 380. The motor 380 may comprise a rotary motor, or a linear actuator. In some implementations, the motor encoder 310 may comprise a separate assembly such as a photodiode and encoder wheel that is affixed to the motor 380. In other implementations, the motor encoder 310 may comprise circuitry configured to drive the motor 380. For example, the autonomous navigation module 220 may utilize the data from the motor encoder 310 to estimate a distance traveled.

A suspension weight sensor 312 provides information indicative of the weight of the robot 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel 802. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors. For example, if the suspension weight sensor 312 indicates no weight on the suspension, the implication is that the robot 104 is no longer resting on its wheels, and thus operation of the motors may be inhibited. In another example, if the suspension weight sensor 312 indicates weight that exceeds a threshold value, the implication is that something heavy is resting on the robot 104 and thus operation of the motors may be inhibited.

One or more bumper switches 314 provide an indication of physical contact between a bumper or other member that is in mechanical contact with the bumper switch 314. Safety module 216 utilize sensor data 228 obtained by the bumper switches 314 to modify the operation of the robot 104. For example, if the bumper switch 314 associated with a front of the robot 104 is triggered, the safety module 216 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 utilize sounds in excess of 20 kHz to determine a distance from the sensor 114 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 228 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 114 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor

320 may operate as a depth camera, providing a two-dimensional image of a scene, as well as data that indicates a distance to each pixel.

Data from the optical sensors 320 may be utilized for collision avoidance. For example, safety module 216 and the autonomous navigation module 220 may utilize the sensor data 228 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 228 may be generated that is indicative of the presence of objects and the relative positions, shapes, and so forth is visible to the lidar 322. Data from the lidar 322 may be used by various modules. For example, the autonomous navigation module 220 may utilize point cloud data generated by the lidar 322 for localization of the robot 104 within the physical environment.

A mast position sensor 324 provides information indicative of a position of the mast. For example, the mast position sensor 324 may comprise limit switches associated with the mast extension mechanism that indicate whether the mast is an extended or retracted position. In other implementations, the mast position sensor 324 may comprise an optical code on at least a portion of the mast that is then interrogated by an optical emitter and a photodetector to determine the distance which the mast is extended. In another implementation, the mast position sensor 324 may comprise an encoder wheel that is attached to a mast motor that is used to raise or lower the mast. The mast position sensor 324 may provide data to the safety module 216. For example, if the robot 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the robot 104. For example, the mast strain sensor 326 may comprise strain gauge or load cell that measures a side-load applied to the mast or a weight on the mast or downward pressure on the mast. The safety module 216 may utilize sensor data 228 obtained by the mast strain sensor 326. For example, if the strain applied to the mast exceeds a threshold amount, the safety module 216 may direct an audible and visible alarm to be presented by the robot 104.

A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more the batteries 106, one or more motors 380, and so forth. In the event the temperature exceeds a threshold value, the component associated with that device temperature sensor 330 may be shut down.

One or more interlock sensors 332 may provide data to the safety module 216 or other circuitry that prevents the robot 104 from operating in an unsafe condition. For example, the interlock sensors 332 may comprise switches that indicate whether an access panel is open. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 228 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provide sensor data 228 indicative of impinging light. For example, the photodetector 342 may provide data indicative of a color, intensity, duration, and so forth.

A camera 344 generates sensor data 228 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 228 comprising images being sent to the autonomous navigation module 220. In another example, the camera 344 may comprise a 10 megapixel or greater camera that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 220 may be acquired using a rolling shutter and subsequently may be processed to mitigate image artifacts.

One or more microphones 346 may be configured to acquire information indicative of sound present in the physical environment. In some implementations, arrays of microphones 346 may be used. These arrays may implement beamforming techniques to provide for directionality of gain. The robot 104 may use the one or more microphones 346 to acquire information from acoustic tags, accept voice input from users 102, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include hygrometer that provides information indicative of relative humidity.

An ambient light sensor 352 may comprise one or more photodetector's or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 220 the task module 124, and so forth. For example, if the floor analysis sensor 356 determines that the floor is wet, the safety module 216 may decrease the speed of the robot 104 and generate a notification alerting the user 102.

The floor analysis sensor 356 may include other components as well. For example, coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster 804 transitioned from an angle of 0° at a first time to 49° at a second time.

The sensors 114 may include a radar 360. The radar 360 may be used to provide information as to a distance, lateral position, and so forth, to an object.

The sensors 114 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture camera, and so forth. For example, NFC tags may be placed at various points within the physical environment to provide landmarks for the autonomous navigation module 220. One or more touch sensors may be utilized to determine contact with a user 102 or other objects.

The robot 104 may include one or more output devices 116. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on the surface, such as the floor, wall, ceiling, and so forth.

A scent dispenser 390 be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the robot 104 may include a haptic output device that provides output that produces particular touch sensations to the user 102. Continuing the example, a motor 380 with an eccentric weight may be used to create a buzz or vibration to allow the robot 104 to simulate the purr of a cat.

Figure 4:
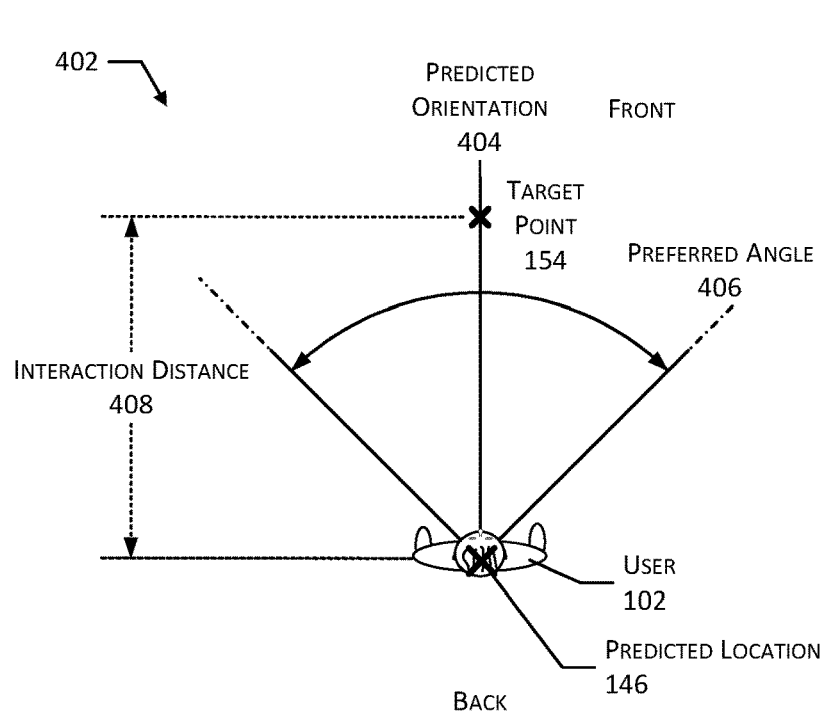
FIG. 4 illustrates placement of a target point with respect to the user and a proxemic cost map that is associated with a user's predicted trajectory, according to some implementations.
Figure 4:
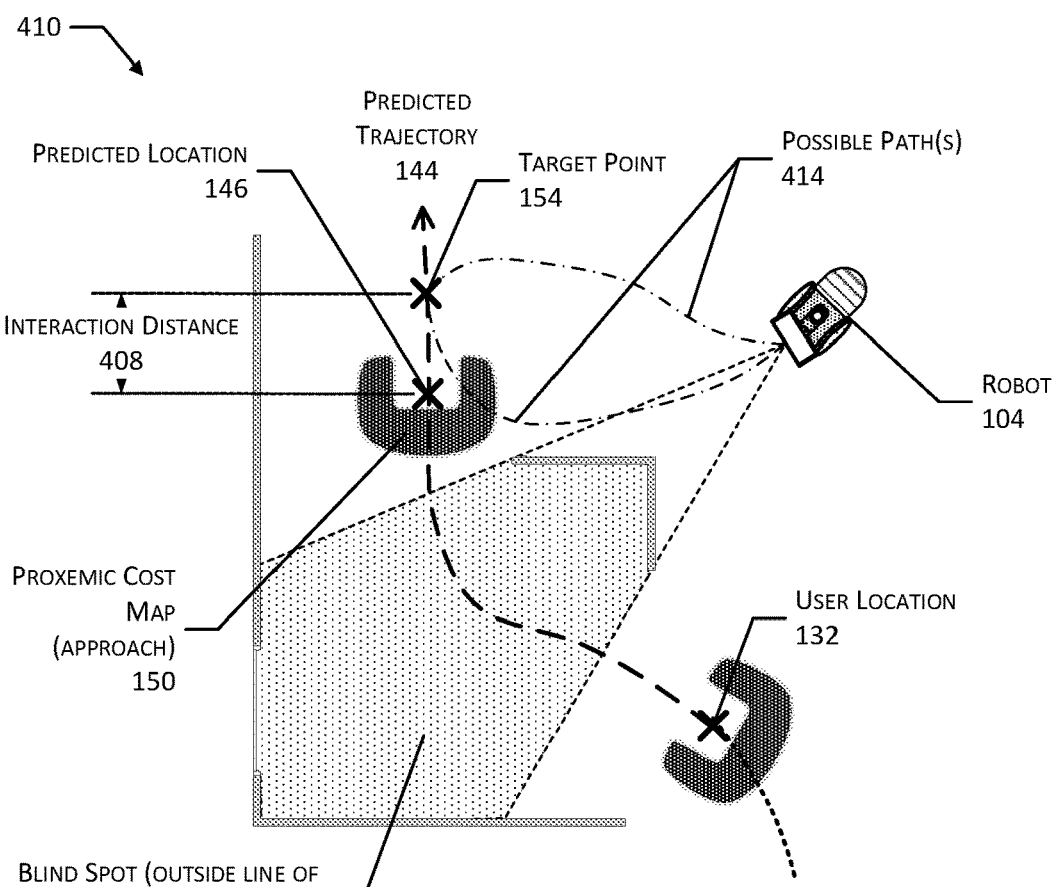

FIG. 4 illustrates an example 400 that includes placement 402 of a target point 154 with respect to the predicted location 146 of the user 102 and movement 410 of the proxemic cost map 150 that is associated with a user location 132 and predicted location 146, according to some implementations.

At 402 the user 102 is depicted with the predicted orientation 404. In this example, the predicted orientation 404 is shown extending away from a front of the user 102 in a line that is perpendicular to a line through the shoulders of the user 102. In other implementations, the predicted orientation 404 used by the system 100 may be expressed in other directions with respect to the user 102. In one implementation, the predicted orientation 404 may be based on the predicted trajectory 144, presence of any obstacles 122 as indicated by the occupancy map 120, and so forth. For example, the predicted orientation 404 may comprise a line that extends from the predicted location 146 to a point that is 30 cm along the predicted trajectory 144.

The proxemic cost map 150 is placed with respect to the predicted location 146. For example, the proxemic cost map 150 for a task that involves an approach behavior as shown here may be centered on the predicted location 146. The orientation of the proxemic cost map 150 may be determined based on the predicted orientation 404.

The proxemic cost map 150 illustrated here, that is associated with an approach behavior, provides a relatively low cost region in front of the user 102 through which the robot 104 may be preferred to traverse while approaching the user 102. The relatively high cost regions extend in a "U" or horseshoe shape around the back of the user 102, with the location of the user 102 being within a well of the "U". As a result, with respect to the proxemic cost values indicated by the proxemic cost map 150, the cost for a possible path 414 that traverses this area behind the user 102 would be higher than a possible path 414 that traverses an area in front of the user 102. The target point 154 is shown within the preferred angle 406 associated with the approach behavior.

The proxemic cost map 150 for approach behavior may be described as comprising two groups of one or more cells, with each cell corresponding to an area in the physical environment. A first group of one or more cells may extend in a first arcuate area, curving from a first angle relative to the predicted orientation 404 to a second angle relative to the user orientation 136. For example, the first group of one or more cells may describe a set of cells that curve around in front of the user 102.

A second group of one or more cells extend in a second arcuate area from the second angle relative to the orientation of the user 136 to the first angle relative to the predicted orientation 404. For example, the second group of one or more cells may describe a set of cells that curve around behind the user 102 and partially to each side, as depicted by the shaded cells in this illustration.

The proxemic cost values of the proxemic cost map 150 encourages the robot 104 to find a path 162 that brings the robot 104 to the target point 154 while avoiding where the user's 102 blind spot is expected to be when they are at the predicted location 146. For example, a first sum of the cell values of the first group of one or more cells is less than a second sum of the cell values of the second group of one or more cells.

During operation, one or more of the proxemic module 148 or the user trajectory module 138 may access the preference data 156. The preference data 156 is indicative of a preferred angle 406 within which the target point 154 may be located. The preferred angle data may provide different preferred angles 406 for a particular user 102, groups of users 102, task, behavior, and so forth. For example, the preferred angle data may indicate that for approach behavior the preferred angle 406 extends between 45 degrees to either side of the predicted orientation 404. In another example, for follow behavior the preferred angle data may indicate a preferred angle 406 that extends from 100 to 135 degrees with respect to the predicted orientation 404. In some implementations, the preferred angle 406 may specify an area within which at least a portion of the robot 104 is within a field of view of the user 102.

In some situations the target point 154 may be selected that is outside of the preferred angle 406. For example, if the occupancy map 120 for the location indicated by the target point 154 corresponds to an obstacle 122, the target point 154 may be placed at a location that is free of an obstacle 122. In other implementations, several different preferred angles 406 may be specified in a hierarchical structure. For example, a first preferred angle 406 may be used, but if not suitable due to the presence of an obstacle 122, a second preferred angle 406 may be used.

The target point 154 is located at an interaction distance 408 from the predicted location 146 of the user 102. For example, the interaction distance 408 may extend from the predicted location 146 of the user 102 to the target point 154. The interaction distance 408 may vary for a particular user 102, groups of users 102, task, behavior, and so forth. For example, the interaction distance 408 for a task that involves the user 102 touching the robot 104 may have an interaction distance 408 that is less than a task of presenting a video call. In some implementations the proxemic module 148 may use an interaction distance 408 that avoids placement of the target point 154 within an obstacle 122. For example, if the default interaction distance 108 is 1.5 m, and there is a wall at 1.2 m, the proxemic module 148 may set the interaction distance 408 to 1 m.

In some implementations, the user trajectory module 138 may select the target point 154 based on the predicted trajectory 144 such that the user 102 is likely to approach the robot 104 at the target point 154, and the user 102 is responsible for determining the interaction distance 408. For example, the user trajectory module 138 may select a target point 154 at which the robot 104 is expected to arrive before the user 102 is expected to arrive at a predicted location 146 that is at least the interaction distance 408 from the target point 154. The interaction distance 408 may be determined based at least in part on a velocity (actual or predicted) of the user 102 or the robot 104 as they approach the target point 154. For example, if the user 102 and the robot 104 are approaching one another in a hallway, the robot 104 may stop at an interaction distance 408 that is twice that used when the user 102 is stationary. The user 102 may then move to reduce the interaction distance 408.

As depicted at 410, the proxemic cost map 150 may be considered to move with the user 102 through the environment and may be considered at the predicted location 146. The particular proxemic cost map 150 arrangement here may be associated with a task that involves an approach behavior.

The user location 132 in the environment is shown, along with the actual trajectory 142 followed by the user 102 to that point. The user trajectory module 138 has determined a predicted trajectory 144 of the user 102 that passes through a blind spot 412 and selects a target point 154.

The blind spot 412 is an area within which the sensors 114 on the robot 104 are unable to directly sensor. In this illustration, a section of wall blocks the robot's 104 line of sight in the blind spot 412. By using the predicted trajectory 144, the robot 104 is able to operate more effectively in environments that have blind spots 412 or other situations in which information about the user location 132 is unavailable.

In some implementations the path planning module 158 may determine a plurality of possible paths 414. In this illustration two possible paths 414 are shown. One possible path 414 passes through a high proxemic cost value area of the proxemic cost map 150, while the other possible path 414 does not. The possible paths 414 may be ranked by their total score comprising a sum of the obstacle cost values and proxemic cost values for the areas they traverse. In this case, the possible path 414 that does not impinge on the high proxemic cost value area may be selected by the path planning module 158 and used as the path 162. The target point 154 may be selected such that is it as at an interaction distance 408 from the predicted location 146 of the user 102, when the user 102 is expected to arrive at that predicted location 146.

Figure 5:
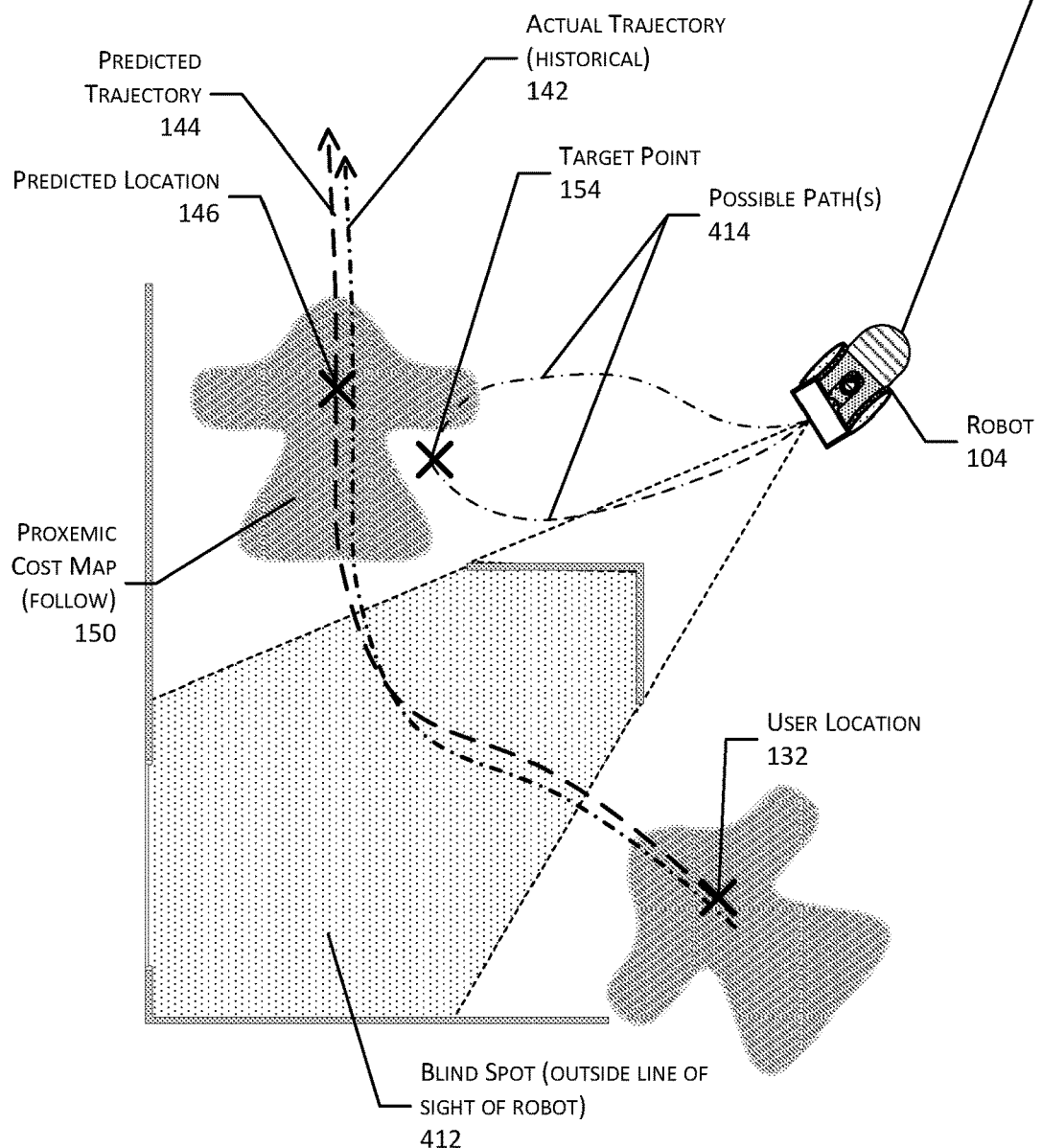
FIG. 5 illustrates proxemic cost maps associated with particular behaviors and predicted locations along a user's predicted trajectory, according to some implementations.

FIG. 5 illustrates an example 500 that includes proxemic cost maps 150 associated with particular behaviors and predicted locations 146 along a user's predicted trajectory 144, according to some implementations.

A table is shown that provides an association between tasks 502, proxemic cost maps used 504, preferred target location 506, and interaction distances 408, according to some implementations. The table is shown for illustration, and not necessarily as a limitation. For example, the data may be stored in other data structures including linked lists, executable code, and so forth. In some implementations the data included in the table may be stored in the preference data 156. In other implementations other data may be included in the table, such as a maximum velocity for a particular behavior.

During operation, one or more of the user trajectory module 138, the proxemic module 148, the path planning module 158, and so forth may use the data presented in the table to determine, for a particular task, the proxemic cost map 150 to be used, the location of the target point 154 with respect to the predicted trajectory 144 or the predicted location 146, and the interaction distance 408.

In this illustration, the robot 104 is performing a task that involves a following behavior. For example, the robot 104 is to continue a video call while the user 102 is in motion, walking through the house. Given this task, the proxemic cost map used 504 is that of the "follow" proxemic cost map 150. An example of the proxemic cost map 150 associated with a follow behavior is shown here. The preferred target location 506 for this type of proxemic cost map 150 is near but not on the predicted trajectory 144 of the user 102, as the intent is for the user 102 to be able to continue to walk unimpeded past the robot 104. The robot 104 will then take up position behind and to the right of the user 102, following them. Based on the data in the table, for this task, the interaction distance 408 between the target point 154 and the predicted location 146 is 1 m.

During operation, the predicted trajectory 144 of the user 102 is determined, and the target point 154 selected that is near, but not on the predicted trajectory 144. The possible paths 414 for the robot 104 to arrive at the target point 154 have been evaluated, and the lowest cost path that does not impinge on the proxemic cost map 150 where it is expected to be when the user 102 is that the predicted location 146 is selected.

As the user 102 passes the robot 104 and continues to move, the robot 104 follows, attempting to maintain a position that is within the interaction distance 408 and within the low proxemic cost areas of the proxemic cost map 150, while avoiding obstacles 122.

After intercepting the user 102, the robot 104 may determine a path 162 used to follow the user 102 based on one or more of the predicted trajectory 144, a current actual trajectory 142, a previous actual trajectory 142 from an earlier time, or the occupancy map 120. For example, the predicted trajectory 144 and an actual trajectory 142 taken on the previous day may be combined and the result used to determine the path 162 of the robot 104 with respect to the user 102 while the user 102 is in motion.

For other types of tasks 502, different preferred target locations 506 may be specified. For example, the "present incoming video call" task 502 has a proxemic cost map used 504 of "approach" and has a preferred target location 506 that is "on predicted trajectory" with an interaction distance 408 of 1.5 m. In this example, the target point 154 would be on or within a threshold distance of the predicted trajectory 144. In some implementations the selection of the target point 154 may avoid areas that are designated as limited visibility or space. For example, the target point 154 may be selected to avoid placement in doorways or at one end of a blind corner.

Some tasks 502 may involve the use of multiple behaviors. For example, the "find specified user" task involves the robot 104 searching the environment to determine the location of a particular user 102. During the search portion of the task 502, the robot 104 may utilize an avoid behavior. Once the particular user 102 is found the robot 104 may then approach. The predicted trajectory data 140 may be used to facilitate these behaviors. For example, the path 162 of the robot 104 may take into consideration the predicted trajectories 144 of the other users 102, keeping the robot 104 away from where those users 102 will be at a given time. Likewise, once the particular user 102 has been found, the predicted trajectory data 140 for that particular user 102 facilitates the approach, such as described above.

Figure 6:
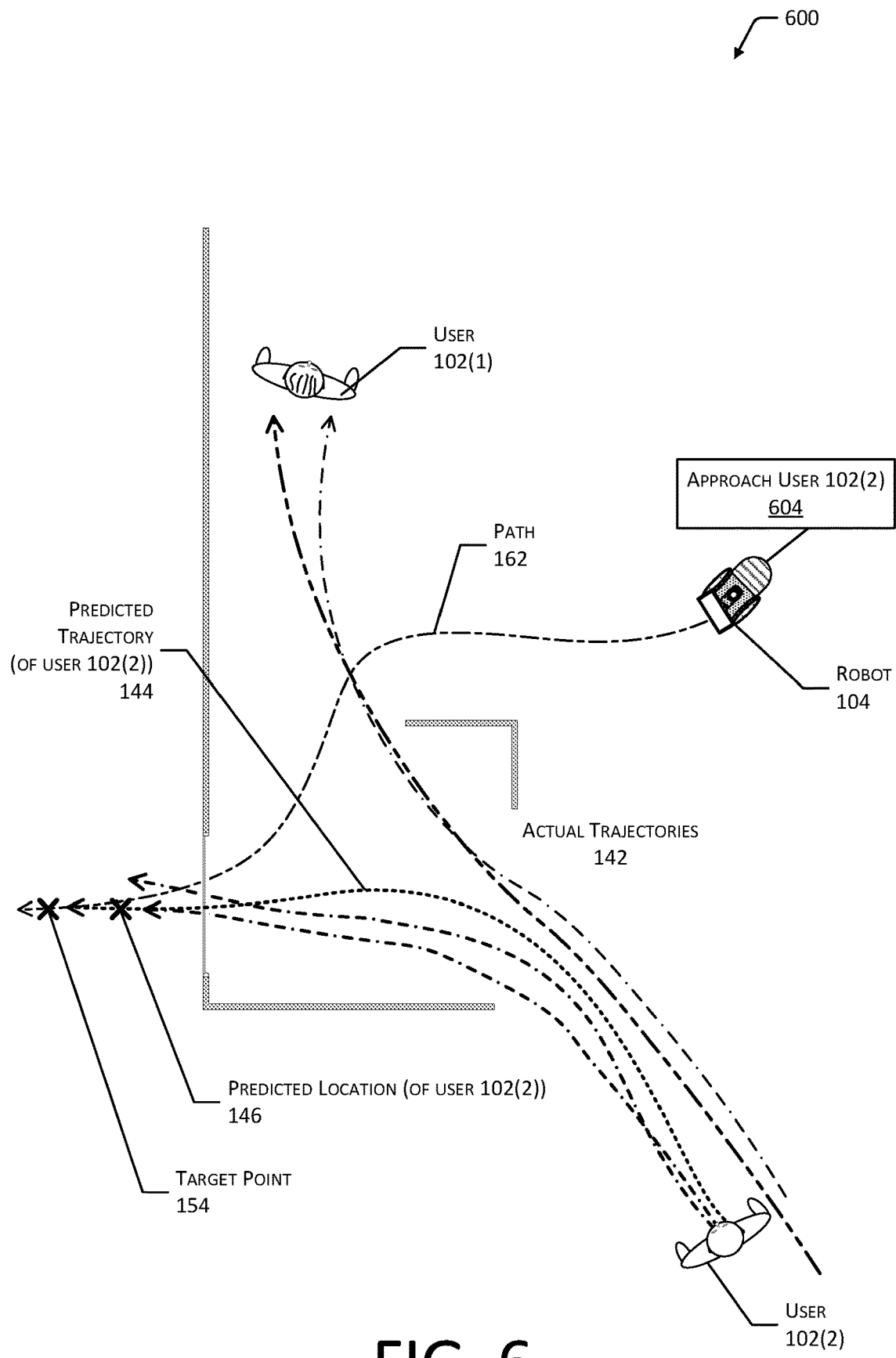
FIG. 6 illustrates actual trajectories and the prediction of trajectories for specific users, according to some implementations.

FIG. 6 illustrates a system 600 for actual trajectories 142 and the predicted trajectories 144 for specific users 102, according to some implementations. Over time, the sensors 114 on the robot 104 or otherwise in the environment may determine actual trajectories 142. These actual trajectories 142 comprise historical data of where users 102 have been at different points in time, and are indicative of their routes through the physical environment. In some implementations, data about the actual trajectories 142 may be associated with particular user identifiers. For example, the historical data may comprise and differentiate between the actual trajectories 142 taken by user 102(1) and user 102(2). If the user 102 is unable to be identified, or is unknown, the user trajectory module 138 may determine the predicted trajectory 144 based on the actual trajectories 142. However, if the user 102 is identified, information about that particular user's 102 previous actual trajectories 142 may be used by the user trajectory module 138 to determine the predicted trajectory 144 for that user 102.

In some implementations, information such as a particular interval of time during the day, day of week, holiday, and so forth may be used to select particular actual trajectories 142 for use in determining the predicted trajectory 144. For example, the particular interval of time during the day may be "morning" from 6 am to 10 am. During this period the user(s) 102 in the environment may follow particular routes that differ from another interval of time, such as "afternoon" from 4 μm to 6 pm. Information that a particular task or type of task that has been previously performed during the particular interval, day of week, holiday, and so forth may be used to select the actual trajectories 142. Continuing the example, if the robot 104 is attempting to approach the user 102 to present a video call during the morning, the actual trajectories 142 associated with the morning may be used to determine the predicted trajectory 144.

In this illustration, user 102(1) has walked through the blind spot 412 formed by the wall section, and continues on into the room with the robot 104. The previously acquired actual trajectories 142 that are associated with user 102(1) indicate that the user 102(1) has previously taken a similar route. In comparison, the actual trajectories 142 of the user 102(2) show that this user has a history of leaving the room through the door that is in the blind spot 412.

In this illustration, the robot 104 has a task to approach user 102(2) 604. The sensors 114 on the robot 104 determine the user 102(2) is in the room. This data, along with the historical actual trajectories 142, is used by the user trajectory module 138 to determine the predicted trajectory data 140. As a result of the previous actual trajectories 142, the user trajectory module 138 determines a predicted trajectory 144 leading into the next room, and a predicted location 146 of the user 102(2). The target point 154 along the predicted trajectory 144 is determined with respect to the predicted location 146 to provide a desired interaction distance 408 when the user 102(2) arrives at the predicted location 146. The robot 104 then moves along the path 162 to meet the user 102.

As shown here, by using the predicted trajectory data 140, the robot 104 is able to more efficiently intercept the user 102(2) and carry out the task 502. Without the predicted trajectory data 140, the robot 104 may have to resort to trying to follow the user 102(2) and catch them from behind.

Figure 7:
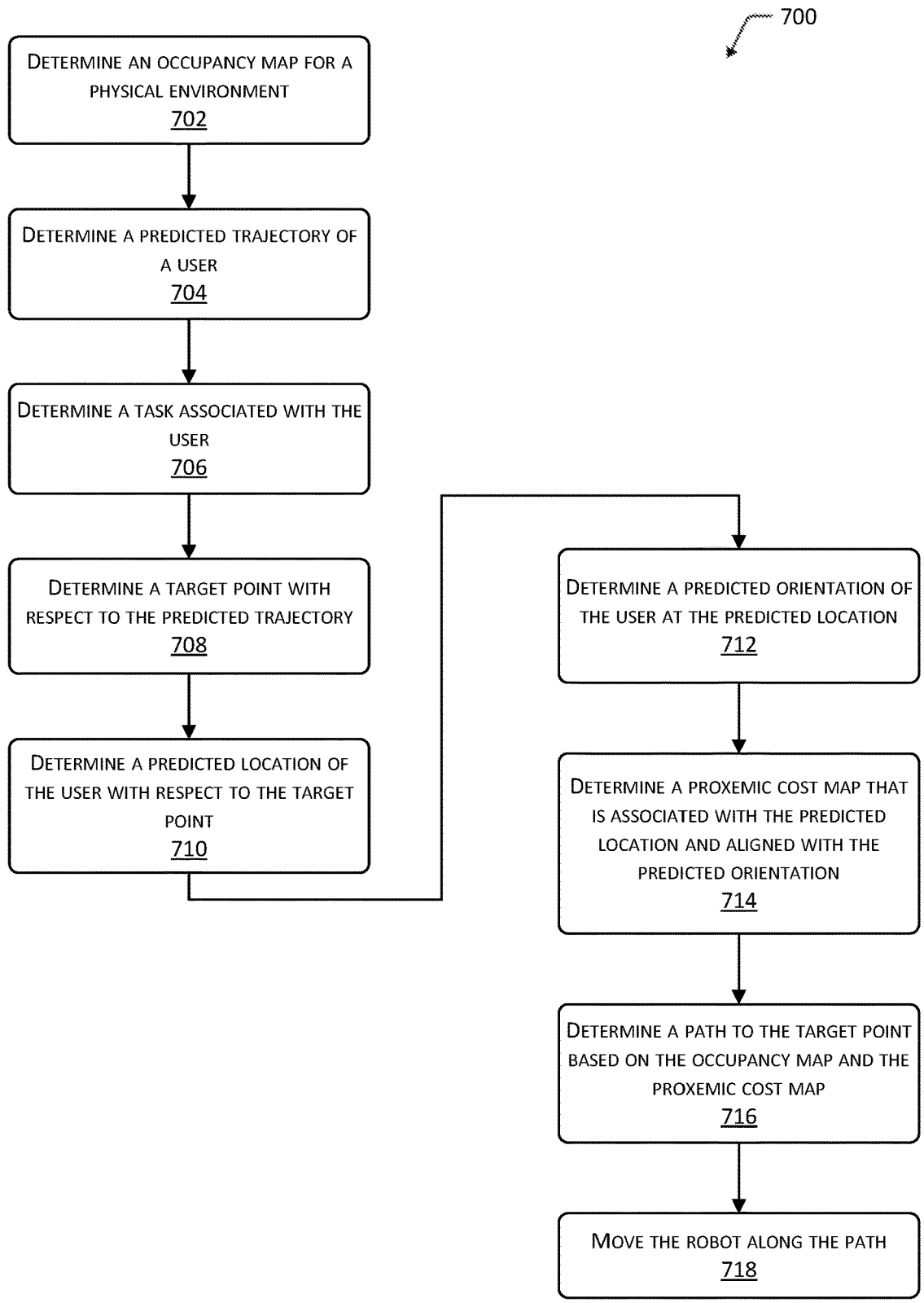
FIG. 7 is a flow diagram of a process to dynamically position a robot with respect to a user's predicted trajectory, according to some implementations.

FIG. 7 is a flow diagram 700 of a process to dynamically position a robot 104 with respect to a user's predicted trajectory 144, according to some implementations. The process may be implemented at least in part by one or more of the processors 108 on the robot 104, the servers 168, the docking station 166, or other devices 170.

At 702 an occupancy map 120 for at least a portion of the physical environment is determined. The occupancy map 120 may be indicative of placement of one or more obstacles 122 that impede movement in the physical environment. In one implementation the occupancy map 120 comprises a plurality of cells with each cell of the plurality of cells representing a particular area in the physical environment and having an obstacle cost value that is indicative of whether the cell is able to be traversed by the robot 104. For example, the occupancy map 120 may be indicative of a first area and a second area in the physical environment. The first area has a first obstacle cost value that is indicative of whether the first area contains an obstacle 122 and the second area has a second obstacle cost value that is indicative of whether the second area contains an obstacle 122.

At 704 a predicted trajectory 144 of the user 102 is determined. In one implementation, the user location data 130 obtained at a plurality of times may be used to determine an actual trajectory 142 of the user 102 that indicates a speed and direction of travel of the user 102. This speed and direction of travel may then be used to extrapolate the predicted location 146 of the user 102 at various times in the future. In another implementation, the user location 132 of the user 102 may be determined at a first and second time, and based on these user locations 132 and previously determined actual trajectories 142, the predicted trajectory 144 may be determined. In yet another implementation, the predicted trajectory 144 may be determined based on data indicative of presence of the user 102. For example, if the user 102 is detected at a first end of a hallway with no exits, the predicted trajectory 144 may extend along the hallway to a second end. In other implementations, other data and techniques may be used to determine the predicted trajectory 144.

At 706 a task 5022 is determined that is associated with a user 102. For example, an incoming video call may be received for the robot 104 to present to the user 102.

At 708 a target point 154 is determined with respect to the predicted trajectory 144. For example, the target point 154 may be the point along the predicted trajectory 144 which the robot 104 is able to reach at some interval of time before the user 102 is expected to arrive. In other implementations, the target point 154 may be determined based on one or more prior actual trajectories 142. For example, the predicted trajectory 144 and the actual trajectory 142 may be combined and the target point 154 determined with respect to this combined trajectory.

In one implementation for an approach behavior, the target point 154 may be determined at a specified distance along the predicted trajectory 144 after the predicted location 146 of the user 102. A plurality of possible paths 414 may then be determined from a current location of the robot 104 to the target point 154. The path 162 is then selected from the plurality of possible paths 414 that places the robot 104 at the target point 154 before the user 102 arrives at the predicted location 146.

In another implementation for a follow behavior, the target point 154 is determined at a first distance from the predicted location 146 of the user 102 and a second distance from the predicted trajectory 144. The target point 154 in this implementation is proximate to a portion of the predicted trajectory 144 that is before the predicted location 146. A plurality of possible paths 414 are determined from a current location of the robot 104 to the target point 154. The path 162 from the plurality of possible paths 414 is selected that places the robot 104 at the target point 154 on or after the user 102 arrives at the predicted location 146.

At 710 the predicted location 146 of the user 102 with respect to the target point 154 may be determined. For example, if the task 502 has an interaction distance 408 of 1.5 m, the predicted location 146 of the user 102 may comprise a point along the predicted trajectory 144 that is 1.5 m from the target point 154 when the user 102 arrives there.

At 712 a predicted orientation 404 is determined for the predicted location 146. For example, the predicted orientation 404 may be a line that extends from the predicted location 146 to a later point along the predicted trajectory 144.

At 714 a proxemic cost map 150 is determined that is associated with the predicted location 146 and the aligned with the predicted orientation 404. As described with regard to FIG. 5, a particular proxemic cost map 150 may be selected based on the task 502 to be performed. For example, the proxemic cost map 150 to be used may be retrieved from memory 112 based on the task 502. The proxemic cost map 150 may comprise a plurality of cells with each cell of the plurality of cells representative of a particular area in a physical environment. A cell value for each of the cells is representative of a cost associated with traversal of the cell by a robot 104.

Continuing the earlier example, the proxemic cost map 150 may be indicative of a third area that is in front of the predicted location 146 of the user 102 and a fourth area that is behind the predicted location 146 of the user 102 in the physical environment, wherein the third area has a first proxemic cost value that is indicative of a cost for the robot 104 to traverse the third area and the fourth area has a second proxemic cost value that is indicative of a cost for the robot 104 to traverse the fourth area.

The proxemic cost map 150 may be aligned with the predicted orientation 404 of the user 102. Continuing the example, the first area and the third area may at least partially overlap and the second area and the fourth area may at least partially overlap.

The proxemic cost map 150 may be associated with a plurality of locations along the predicted trajectory 144. For example, instead of considering the proxemic cost map 150 at the predicted location 146 before the target point 154, the proxemic cost map 150 may be applied to a plurality of times or points along the predicted trajectory 144. The path 162 may then be determined using the proxemic cost values of the proxemic cost maps 150 at different points along the predicted trajectory 144 at different times.

In other implementations the proxemic cost map 150 for use may be selected based at least in part on identity of the user 102, location within the environment, and so forth. For example, a particular user 102 may have a preferred proxemic cost map 150.

At 716 path plan data 160 indicative of a path 162 to the target point 154 is determined. In one implementation, the path planning module 158 may use the occupancy map 120, the proxemic cost map 150, and other data to determine the costs of various possible paths 414 from a current location of the robot 104 to the target point 154. The possible path 414 that exhibits the lowest total cost of obstacle cost values and proxemic cost values may be selected to be used to generate the path plan data 160 indicative of the path 162.

Continuing the example, a first path from a first point in the physical environment to the target point 154 may be determined that passes through the first area and the third area. A first score of the first path is determined by summing the first obstacle cost value and the first proxemic cost value. A second path is determined from the first point in the physical environment to the target point 154 that passes through the second area and the fourth area. A second score of the second path is determined by summing the second obstacle cost value and the second proxemic cost value. In this example, the first score is less than the second score, and so the first path is selected for use.

At 718 the robot 104 is moved along at least a portion of the path 162 indicated by the first path as described by the path plan data 160. During operation the process 700, or portions thereof, may be repeated. For example, the process 700 may repeat every 200 milliseconds, resulting in ongoing update to a path 162.

Figure 8:
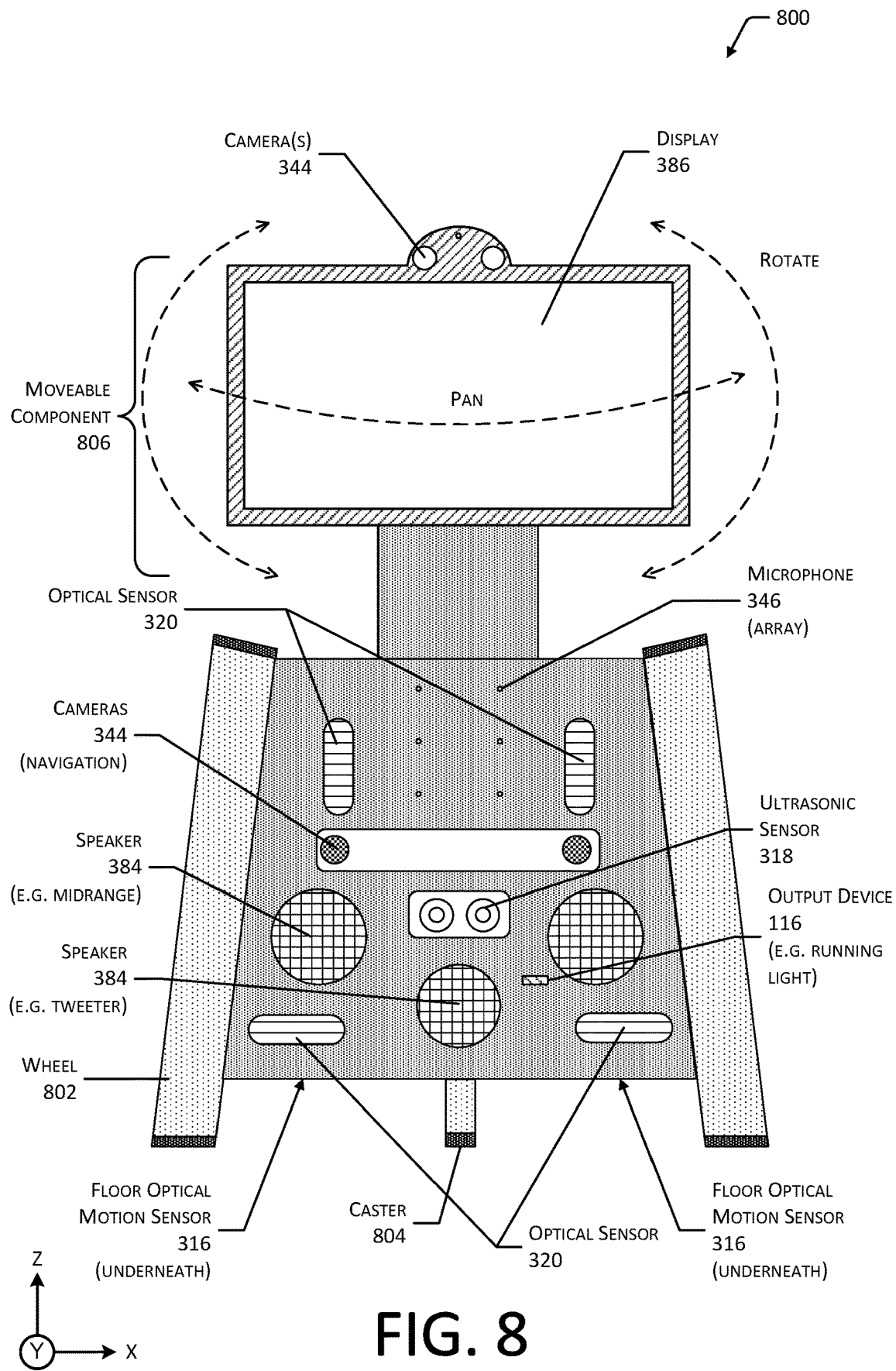
FIG. 8 is a front view of the robot, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 114. A first pair of optical sensors 320 are located along the lower edge of the front while a second pair of optical sensors 320 are located along an upper portion of the front. Between the second set of the optical sensors 320 is a microphone 346 (array).

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 110°. A relatively wide FOV allows for easier detection of moving objects, such as users or pets that may be in the path of the robot 104. Also, the relatively wide FOV facilitates the robot 104 being able to detect objects when turning.

The sensor data 228 comprising images produced by this pair of cameras 344 can be used by the autonomous navigation module 220 for navigation of the robot 104. The cameras 344 used for navigation may be of different resolution from, or sensitive to different wavelengths than, cameras 344 used for other purposes such as video communication. For example, the navigation cameras 344 may be sensitive to infrared light allowing the robot 104 to operate in darkness, while the camera 344 mounted above the display 386 may be sensitive to visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

The robot 104 may comprise a moveable component 806. In one implementation, the moveable component 806 may include the display 386 and cameras 344 arranged above the display 386. The cameras 344 may operate to provide stereoimages of the physical environment, the user 102, and so forth. For example, an image from each of the cameras 344 above the display 386 may be accessed and used to generate stereo image data about a face of a user 102. This stereoimage data may then be used for facial recognition, user identification, gesture recognition, gaze tracking, and so forth. In other implementations, a single camera 344 may be present above the display 386.

The moveable component 806 is mounted on a movable mount that allows for movement with respect to the chassis of the robot 104. The movable mount may allow the moveable component 806 to be moved by the moveable component actuators 392 along one or more degrees of freedom. For example, the moveable component 806 may pan, tilt, and rotate as depicted here. The size of the moveable component 806 may vary. In one implementation, the display 386 in the moveable component 806 may be approximately 8 inches as measured diagonally from one corner to another.

An ultrasonic sensor 318 is also mounted on the front of the robot 104 and may be used to provide sensor data 228 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user, and so forth.

One or more bumper switches 314 (not shown) may be present along the front of the robot 104. For example, a portion of the housing of the robot 104 that is at the leading edge may be mechanically coupled to one or more bumper switches 314.

Other output devices 116, such as one or more lights 382, may be on an exterior of the robot 104. For example, a running light may be arranged on a front of the robot 104. The running light may provide light for operation of one or more of the cameras 344, a visible indicator to the user 102 that the robot 104 is in operation, and so forth.

One or more of the FOMS 316 are located on an underside of the robot 104.

Figure 9:
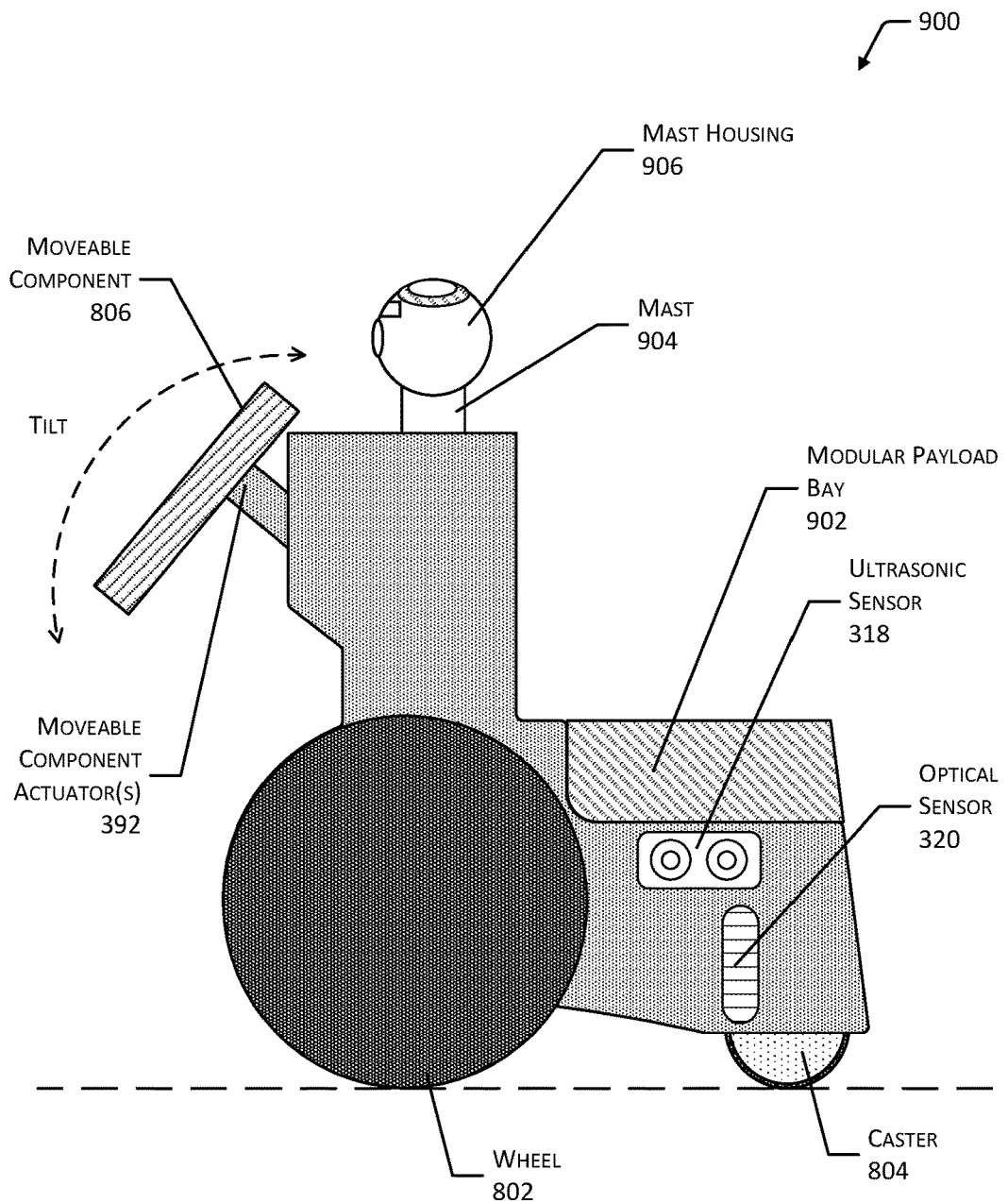
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user 102 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing of the robot 104 may comprise a shape-memory polymer that upon impact forms but then over time returns to the original shape.

In this side view, the left side of the robot 104 is depicted. An ultrasonic sensor 318 and an optical sensor 320 are present on either side of the robot 104.

In this illustration, the caster 804 is shown in a trailing configuration, in which the caster 804 is located behind or aft of the axle of the wheels 802. In another implementation (not shown) the caster 804 may be in front of the axle of the wheels 802. For example, the caster 804 may be a leading caster 804 positioned forward of the axle of the wheels 802.

The robot 104 may include a modular payload bay 902 located within the lower structure. The modular payload bay 902 provides one or more of mechanical or electrical connectivity with robot 104. For example, the modular payload bay 902 may include one or more engagement features such as slots, cams, ridges, magnets, bolts, and so forth that are used to mechanically secure an accessory within the modular payload bay 902. In one implementation, the modular payload bay 902 may comprise walls within which the accessory may sit. In another implementation, the modular payload bay 902 may include other mechanical engagement features such as slots into which the accessory may be slid and engaged.

The modular payload bay 902 may include one or more electrical connections. For example, the electrical connections may comprise a universal serial bus (USB) connection that allows for the transfer of data, electrical power, and so forth between the robot 104 and the accessory.

As described above, the robot 104 may incorporate a moveable component 806 that includes a display 386 which may be utilized to present visual information to the user 102. In some implementations, the moveable component 806 may be located with or affixed to the upper structure. In some implementations, the display 386 may comprise a touch screen that allows user input to be acquired. The moveable component 806 is mounted on a movable mount that allows motion along one or more axes. For example, the movable mount may allow the moveable component 806 to be panned, tilted, and rotated by the moveable component actuators 392. The moveable component 806 may be moved to provide a desired viewing angle to the user 102, to provide output from the robot 104, and so forth. For example, the output may comprise the moveable component 806 being tilted forward and backward to provide a gestural output equivalent to a human nodding their head, or panning to face the target point 154 as described above.

The robot 104 may incorporate a mast 904. The mast 904 provides a location from which additional sensors 114 or output devices 116 may be placed at a higher vantage point. The mast 904 may be fixed or extensible. The extensible mast 904 is depicted in this illustration. The extensible mast 904 may be transitioned between a retracted state, an extended state, or placed at some intermediate value between the two.

At the top of the mast 904 may be a mast housing 906. In this illustration, the mast housing 906 is approximately spherical, however in other implementations other physical form factors such as cylinders, squares, or other shapes may be utilized.

The mast housing 906 may contain one or more sensors 114. For example, the sensors 114 may include a camera 344 having a field-of-view (FOV). In another example, the sensors 114 may include an optical sensor 320 to determine a distance to an object. The optical sensor 320 may look upward, and may provide information as to whether there is sufficient clearance above the robot 104 to deploy the mast 904. In another example, the mast housing 906 may include one or more microphones 346.

One or more output devices 116 may also be contained by the mast housing 906. For example, the output devices 116 may include a camera flash used to provide illumination for the camera 344, an indicator light that provides information indicative of a particular operation of the robot 104, and so forth.

Other output devices 116, such as one or more lights 382, may be elsewhere on an exterior of the robot 104. For example, a light 382 may be arranged on a side of the upper structure.

In some implementations, one or more of the sensors 114, output devices 116, or the mast housing 906 may be movable. For example, the motor 380 may allow for the mast 904, the mast housing 906, or a combination thereof to be panned allowing the FOV to move from left to right.

In some implementations, the moveable component 806 may be mounted to the mast 904. For example, the moveable component 806 may be affixed to the mast housing 906. In another example, the moveable component 806 may be mounted to a portion of the mast 904, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining an occupancy map comprising obstacle cost values associated with particular areas within a physical environment;
   determining a predicted trajectory of a user in the physical environment based at least in part on the occupancy map;
   determining a task associated with the user;
   determining a first location with respect to the predicted trajectory;
   determining a predicted location of the user with respect to the first location;
   determining a predicted orientation of the user at the predicted location, wherein the predicted orientation represents a line that extends from the predicted location to a target point along the predicted trajectory;
   determining, based on the task, a proxemic cost map;
   positioning the proxemic cost map with respect to the predicted location of the user;
   aligning the proxemic cost map with respect to the predicted orientation, wherein:
      in the proxemic cost map, a first cost value is assigned to areas positioned behind the user and a second cost value is assigned to areas positioned in front of the user, the first cost value being higher than the second cost value;
   determining, based at least in part on the occupancy map, the first location, and the proxemic cost map, a path from a second location in the physical environment to the first location; and
   moving a robot along at least a portion of the path towards the first location.

2. The method of claim 1, further comprising:
   determining an actual trajectory of the user, wherein the actual trajectory is associated with a particular time during a day or a day of a week; and
   determining the predicted trajectory further based at least in part on the actual trajectory.

3. The method of claim 1, further comprising:
   determining a user identifier associated with the user;
   determining an actual trajectory in the physical environment that is associated with the user identifier; and
   determining the predicted trajectory further based at least in part on the actual trajectory.

4. The method of claim 1, further comprising:
   determining the first location at a specified distance along the predicted trajectory after the predicted location of the user;
   determining a plurality of possible paths from a current location of the robot to the first location; and
   selecting the path from the plurality of possible paths that places the robot at the first location before an expected time of arrival of the user at the predicted location.

5. The method of claim 1, further comprising:
   determining the first location at a first distance from the predicted location of the user and a second distance from the predicted trajectory;
   determining a plurality of possible paths from a current location of the robot to the first location; and
   selecting the path from the plurality of possible paths that places the robot at the first location on or after an expected time of arrival of the user at the predicted location.

6. The method of claim 1, further comprising:
   determining a possible path from a current location of the robot to the second location, wherein the possible path intersects the predicted trajectory;
   determining a predicted time of arrival of the robot at the second location using the possible path;

determining, based on the predicted trajectory, a second predicted location of the user at the predicted time of arrival;
determining the second predicted location is at least a first distance from the second location; and
wherein the path is the possible path.

7. The method of claim 1, further comprising:
determining, based at least in part on the task, a first distance; and
wherein the first location is at the first distance from the predicted location of the user.

8. The method of claim 1, further comprising:
for each of a plurality of times:
    determining a corresponding predicted location and a corresponding predicted orientation of the user along a predicted path;
    associating a corresponding proxemic cost map with the corresponding predicted location of the user; and
    aligning the corresponding proxemic cost map with respect to the corresponding predicted orientation of the user.

9. The method of claim 1, further comprising:
selecting the proxemic cost map based on the task, wherein the task comprises approaching or following the user.

10. The method of claim 1, further comprising:
determining a third location with respect to the predicted location;
determining a first sum comprising a sum of obstacle cost values for particular areas designated by the occupancy map that are between the third location and the predicted location;
determining the first sum is less than a threshold value; and
wherein the first location is the third location.

11. The method of claim 1, further comprising:
determining, for each of a plurality of times, an actual location of the user in the physical environment; and
determining the predicted trajectory based on the actual locations of the user, wherein the predicted trajectory avoids obstacle cost values greater than a threshold value.

12. A method comprising:
determining an occupancy map comprising obstacle cost values associated with particular areas within a physical environment;
determining a predicted trajectory of a user based at least in part on the occupancy map;
determining a task associated with the user;
determining a first location based on the predicted trajectory;
determining a predicted location of the user with respect to the first location;
determining a predicted orientation of the user at the predicted location, wherein the predicted orientation represents a line that extends from the predicted location to a target point along the predicted trajectory;
determining, based on the task, a proxemic cost map;
positioning the proxemic cost map with respect to the predicted location of the user;
aligning the proxemic cost map with respect to the predicted orientation, wherein:
    the proxemic cost map comprises a plurality of cells with each cell describing a particular area positioned with respect to the predicted location of the user,
    the proxemic cost map provides a proxemic cost value for traversal by a device through each of the particular areas, and
    in the proxemic cost map, a first cost value is assigned to areas positioned behind the user and a second cost value is assigned to areas positioned in front of the user, the first cost value being higher than the second cost value;
determining, based at least in part on the occupancy map, the proxemic cost map, and the first location, a path from a first point in the physical environment to the first location in the physical environment; and
moving the device along at least a portion of the path towards the first location.

13. The method of claim 12, further comprising:
determining an actual trajectory of the user in the physical environment; and
determining the predicted trajectory further based at least in part on the actual trajectory.

14. The method of claim 12, further comprising:
determining the first location at a specified distance along the predicted trajectory after the predicted location of the user;
determining a plurality of possible paths from a current location of the device to the first location; and
selecting the path from the plurality of possible paths that places the device at the first location before an expected time of arrival of the user arrives at the predicted location.

15. The method of claim 12, further comprising:
determining, based at least in part on the task, a first distance;
determining, based on the predicted trajectory, the predicted location of the user at a first time; and
wherein the first location is at the first distance from the predicted location of the user.

16. The method of claim 12, further comprising:
determining the predicted location of the user along a predicted path; and
associating the proxemic cost map with the predicted location of the user.

17. The method of claim 12, further comprising:
determining a second location with respect to the predicted location;
determining a first sum comprising a sum of obstacle cost values for areas designated by the occupancy map that are between the first location and the predicted location;
determining the first sum is less than a threshold value; and
wherein the second location is the first location.

18. A device comprising:
one or more memories storing first computer-executable instructions; and
one or more processors to execute the first computer-executable instructions to:
    determine an occupancy map comprising obstacle cost values associated with particular areas within a physical environment;
    determine a predicted trajectory of a user based at least in part on the occupancy map;
    determine a task associated with the user;
    determine a first location based on the predicted trajectory;
    determine a predicted location of the user with respect to the first location;

determine a predicted orientation of the user at the predicted location, wherein the predicted orientation represents a line that extends from the predicted location to a target point along the predicted trajectory;

select a proxemic cost map from a plurality of proxemic cost maps, based on the task;

position the proxemic cost map with respect to the predicted location of the user;

align the proxemic cost map with respect to the predicted orientation, wherein:
in the proxemic cost map, a first cost value is assigned to areas positioned behind the user and a second cost value is assigned to areas positioned in front of the user, the first cost value being higher than the second cost value;

determine, based at least in part on the occupancy map, the proxemic cost map, and the first location, a path from a first point in the physical environment to the first location in the physical environment; and move the device along at least a portion of the path towards the first location.

19. The device of claim 18, the one or more processors to further execute the first computer-executable instructions to:
determine the task involves the device approaching the user;
retrieve, from previously stored data associated with the task, a first distance; and
wherein the first point is at the first distance from the first location.

20. The device of claim 18, the one or more processors to further execute the first computer-executable instructions to:
determine a user identifier associated with the user;
determine an actual trajectory in the physical environment that is associated with the user identifier; and
determine the predicted trajectory further based at least in part on the actual trajectory.

* * * * *

UNITED STATES PATENT AND TRADEMARK OFFICE
CERTIFICATE OF CORRECTION

PATENT NO. : 11,409,295 B1
APPLICATION NO. : 16/119407
DATED : August 9, 2022
INVENTOR(S) : Sandeep Samdaria et al.

It is certified that error appears in the above-identified patent and that said Letters Patent is hereby corrected as shown below:

In the Claims

Column 38, Claim 14, Line 28:
Currently reads:
"time of arrival of the user arrives at the predicted"
When it should read:
--time of arrival of the user at the predicted--.

Column 39, Claim 18, Lines 15-17:
Currently read:
 "in front of
the user, the first cost value being higher than the
 second cost value;"
When they should read:
 --in front of the user, the first cost value being higher than the second cost value;--.

Signed and Sealed this
Thirteenth Day of September, 2022

*Katherine Kelly Vidal*

Katherine Kelly Vidal
*Director of the United States Patent and Trademark Office*